(12) United States Patent
Xu

(10) Patent No.: US 12,726,528 B2
(45) Date of Patent: Sep. 1, 2026

(54) SUPPORT FOR SIMULTANEOUS EDGE APPLICATION SERVER (EAS) CONNECTIVITY IN APPLICATION CONTEXT RELOCATION (ACR)

(71) Applicant: Telefonaktiebolaget LM Ericsson (publ), Stockholm (SE)

(72) Inventor: Wenliang Xu, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 36 days.

(21) Appl. No.: 18/729,711

(22) PCT Filed: Jan. 28, 2023

(86) PCT No.: PCT/CN2023/073517

§ 371 (c)(1),
(2) Date: Jul. 17, 2024

(87) PCT Pub. No.: WO2023/143492

PCT Pub. Date: Aug. 3, 2023

(65) Prior Publication Data

US 2025/0106263 A1 Mar. 27, 2025

(30) Foreign Application Priority Data

Jan. 28, 2022 (WO) ................ PCT/CN2022/074527

(51) Int. Cl.
*G06F 13/00* (2006.01)
*H04L 65/1063* (2022.01)
(Continued)

(52) U.S. Cl.
CPC ...... *H04L 65/1063* (2013.01); *H04L 65/1073* (2013.01); *H04L 65/80* (2013.01)

(58) Field of Classification Search
CPC . H04L 65/1063; H04L 65/1073; H04L 65/80; H04L 65/1016; H04L 65/1069;
(Continued)

(56) References Cited

U.S. PATENT DOCUMENTS 12,323,494 B2 * 6/2025 Gupta ..................... H04L 67/51
2009/0034428 A1 * 2/2009 Jeong .................. H04L 47/2408
370/252

(Continued)

FOREIGN PATENT DOCUMENTS

KR 20210087881 A 7/2021
WO 2021066498 A1 4/2021

OTHER PUBLICATIONS

Office Action for Australian Patent Application No. 2023212361 dated Feb. 6, 2025, 3 pages.

(Continued)

*Primary Examiner* — Kenneth R Coulter
(74) *Attorney, Agent, or Firm* — Sage Patent Group

(57) ABSTRACT

The present disclosure is related to support for simultaneous EAP connectivity in ACR. A method by an AC deployed at a UE for supporting simultaneous EAS connectivity in ACR includes: communicating with a T-EAS via a first connection established between the AC and the T-EAS before a second connection between the AC and an S-EAS is released, to trigger an ACT procedure between the T-EAS and the S-EAS.

20 Claims, 9 Drawing Sheets

800

An AC may communicate with a T-EAS via a first connection established between the AC and the T-EAS before a second connection between the AC and a S-EAS is released, to trigger an ACT procedure between the T-EAS and the S-EAS

S810

(51) Int. Cl.
*H04L 65/1073* (2022.01)
*H04L 65/80* (2022.01)

(58) Field of Classification Search
CPC .... H04L 67/148; H04W 36/125; H04W 40/36
USPC .................................. 709/201, 203, 220–222
See application file for complete search history.

(56) References Cited

U.S. PATENT DOCUMENTS

| | | | | |
|---|---|---|---|---|
| 2021/0337043 | A1 | 10/2021 | Hall et al. | |
| 2022/0015018 | A1 | 1/2022 | Kim et al. | |
| 2022/0338113 | A1* | 10/2022 | Gupta | H04W 48/18 |
| 2024/0276567 | A1* | 8/2024 | Takakura | H04W 76/10 |

OTHER PUBLICATIONS

International Search Report and Written Opinion of the International Searching Authority, PCT/CN2023/073517, mailed May 22, 2023, 20 pages.

Convida Wireless LLC et al., "Key Issue #9 Solution on Preserving Service Continuity," 3GPP TSG-SA WG6 Meeting #33, S6-191900 (Revision of S6-191640, Merge of S6-161700), Sophia Antipolis, France, Sep. 2-6, 2016, 4 pages.

3GPP TS 23.548 v17.1.0 (Dec. 2021); 3rd Generation Partnership Project; Technical Specification Group Services and System Aspects; 5G System Enhancements for Edge Computing; Stage 2 (Release 17), 55 pages.

3GPP TS 23.558 v17.2.0 (Dec. 2021); 3rd Generation Partnership Project; Technical Specification Group Services and System Aspects; Architecture for enabling Edge Applications (Release 17), 163 pages.

Ericsson, "New KI Simultaneous EAS Connectivity in ACR," 3GPP TSG-SA WG6 Meeting #47-e, S6-220297 (reivsion of S6-220160), e-meeting, Feb. 14-22, 2022, 3 pages.

Ericsson, "Support simultaneous EAS Connectively in ACR," 3GPP TSG-SA WG6 Meeting #47-e, S6-220161 (Revision of S6-22xxxx), e-meeting, Feb. 14-22, 2022, 6 pages.

International Preliminary Report on Patentability of the International Preliminary Examining Authority, PCT/CN2023/073517, mailed Apr. 18, 2024, 75 pages.

3GPP TR 23.700-98 v0.4.0 (Dec. 2021); 3rd Generation Partnership Project; Technical Specification Group Services and System Aspects; Technical Specification Group Services and System Aspects; Study on Enhanced architecture for enabling Edge Applications; (Release 18), 52 pages.

3GPP TS 23.501 v17.3.0 (Dec. 2021); 3rd Generation Partnership Project; Technical Specification Group Services and System Aspects; System architecture for the 5G System (5GS); Stage 2 (Release 17), 559 pages.

Written Opinion of the International Preliminary Examining Authority, PCT/CN2023/073517, mailed Dec. 14, 2023, 10 pages.

* cited by examiner

FIG. 4

SUPPORT FOR SIMULTANEOUS EDGE APPLICATION SERVER (EAS) CONNECTIVITY IN APPLICATION CONTEXT RELOCATION (ACR)

CROSS-REFERENCE TO RELATED APPLICATIONS

This application claims priority to PCT International Application No. PCT/CN2023/073517, entitled "SUPPORT FOR SIMULTANEOUS EDGE APPLICATION SERVER (EAS) CONNECTIVITY IN APPLICATION CONTEXT RELOCATION (ACR)", filed on Jan. 28, 2023, and to PCT International Application No. PCT/CN2022/074527, entitled "SUPPORT FOR SIMULTANEOUS EDGE APPLICATION SERVER (EAS) CONNECTIVITY IN APPLICATION CONTEXT RELOCATION (ACR)", filed on Jan. 28, 2022, which are incorporated herein by reference in their entirety.

TECHNICAL FIELD

The present disclosure is related to the field of telecommunications, and in particular, to UEs, network nodes, and methods for supporting simultaneous edge application server (EAS) connectivity in Application Context Relocation (ACR).

BACKGROUND

Edge computing as an evolution of cloud computing brings application hosting from centralized data centers down to the network edge, closer to consumers and the data generated by applications. Edge computing is acknowledged as one of the key pillars for meeting the demanding Key Performance Indicators (KPIs) of 5G, especially as far as low latency and bandwidth efficiency are concerned. However, not only is edge computing in telecommunications networks a technical enabler for the demanding KPIs, it also plays an essential role in the transformation of the telecommunications business, where telecommunications networks are turning into versatile service platforms for industry and other specific customer segments. This transformation is supported by edge computing, as it opens the network edge for applications and services, including those from third parties.

A lot of technical specifications or standards are proposed for edge computing. For example, European Telecommunications Standards Institution (ETSI) Industry Specification Group (ISG) MEC (Multi-access Edge Computing) is one of technical standards for edge computing. Further, the 3$^{rd}$ generation partnership project (3GPP) also proposes its own technical specification for edge computing, for example, 3GPP TS 23.558, *"Architecture for enabling Edge Applications"*.

Since user mobility in mobile systems is inevitable when a UE moves within a mobile network, an Edge Application Server (EAS) in an Edge Data Network (EDN) serving the UE can be changed to another EAS in the same EDN or in another EDN. Switching EAS (might include application relocation and user context transfer) is a complicated and time consuming task. Therefore, it is incredibly challenging to ensure quality of experience (QoE) during EAS switching, especially in highly mobile, low latency scenario, such as connected vehicles or extended Reality (XR).

SUMMARY

According to a first aspect of the present disclosure, a method by an Application Client (AC) deployed at a UE for supporting simultaneous EAS connectivity in ACR is provided. The method comprises: communicating with a target EAS (T-EAS) via a first connection established between the AC and the T-EAS before a second connection between the AC and a source EAS (S-EAS) is released, to trigger an Application Context Transfer (ACT) procedure between the T-EAS and the S-EAS.

In some embodiments, application traffic from the AC is received by at least one of the S-EAS and the T-EAS during the ACT procedure; and/or application traffic to the AC is transmitted by at least one of the S-EAS and the T-EAS during the ACT procedure. In some embodiments, at least one of following is true: the application traffic from the AC is received by the T-EAS when the UE is located outside of the service area of the T-EAS; the application traffic to the AC is transmitted by the T-EAS when the UE is located outside of the service area of the T-EAS; the application traffic from the AC is received by the S-EAS when the UE is located outside of the service area of the SEAS; and the application traffic to the AC is transmitted by the S-EAS when the UE is located outside of the service area of the S-EAS.

In some embodiments, before the step of communicating with the T-EAS, the method further comprises: transmitting, to an Edge Enabler Client (EEC) associated with the AC, a first message comprising a first parameter indicating whether simultaneous EAS connectivity in ACR is needed by the AC or not. In some embodiments, the first message further comprises a second parameter indicating inactive time guidance for keeping connectivity towards the S-EAS when the first parameter indicates that the simultaneous EAS connectivity in ACR is needed by the AC. In some embodiments, before the step of communicating with the T-EAS, the method further comprises: triggering the EEC to transmit, to an Edge Enabler Server (EES) deployed in a first network node, a second message requesting an ACR, wherein the second message comprises the first parameter and/or the second parameter. In some embodiments, the first message is an AC registration request for registering the AC with the EEC, and/or wherein the second message is an ACR request for requesting an ACR from the S-EAS to the T-EAS for the AC.

According to a second aspect of the present disclosure, a UE is provided. The UE comprises: a processor; a memory storing instructions which, when executed by the processor, cause the processor to perform the method of any of the first aspect.

According to a third aspect of the present disclosure, a UE is provided. The UE comprise: a communicating module configured to communicate with a T-EAS via a first connection established between the AC and the T-EAS before a second connection between the AC and an S-EAS is released, to trigger an ACT procedure between the T-EAS and the S-EAS. In some embodiments, the UE comprises one or more modules configured to perform the method of any of the first aspect.

According to a fourth aspect of the present disclosure, a method by an EEC deployed at a UE for supporting simultaneous EAS connectivity in ACR is provided. The method comprises: transmitting, to a first network node, a second message requesting an ACR, wherein the second message comprises a first parameter indicating whether the simultaneous EAS connectivity in the ACR is needed by an AC associated with the EEC or not; and receiving, from the first network node, a third message comprising a third parameter indicating whether the ACR is successfully launched or not.

In some embodiments, before the step of transmitting the second message, the method further comprises: receiving, from the AC, a first message comprising the first parameter; and storing, in an AC profile for the AC, the first parameter at least based on the first message. In some embodiments, before the step of transmitting the second message, the method further comprises: transmitting, to a target EES (T-EES) deployed in a second network node, a fourth message to query the second network node for one or more T-EASs for selection by the AC and/or the EEC, wherein the fourth message comprises the first parameter, wherein the first parameter is determined at least based on a stored AC profile for the AC. In some embodiments, before the step of transmitting the second message, the method further comprises: transmitting, to a T-EES deployed in a second network node, a fourth message to query the second network node for one or more T-EASs for selection by the AC and/or the EEC, wherein the fourth message comprises a fourth parameter indicating whether an early T-EAS connection is needed by the AC or not, wherein the fourth parameter is determined at least based on a stored AC profile for the AC. In some embodiments, before the step of transmitting the second message, the method further comprises: transmitting, to a T-EES deployed in a second network node, a fourth message to query the second network node for one or more T-EASs for selection by the AC and/or the EEC, wherein the fourth message comprises a fifth parameter whether a T-EAS with Central Application Server (CAS) support is needed by the AC or not, wherein the fifth parameter is determined at least based on a stored AC profile for the AC.

In some embodiments, the method further comprises: receiving, from the second network node, at least one T-EAS that supports the simultaneous EAS connectivity in ACR for the AC when the first parameter indicates that the simultaneous EAS connectivity in ACR is needed by the AC. In some embodiments, the at least one T-EAS supports the simultaneous EAS connectivity in ACR for the AC by also functioning as a CAS that has no restriction or less restriction in its service area than an EAS.

In some embodiments, the method further comprises: receiving, from the second network node, at least one T-EAS that supports and/or does not support the simultaneous EAS connectivity in ACR for the AC when the first parameter indicates that the simultaneous EAS connectivity in ACR is not needed by the AC. In some embodiments, the first message is an AC registration request for registering the AC with the EEC, and/or the second message is an ACR request for requesting an ACR from an S-EAS to a T-EAS for the AC, and the third message is an ACR response, and/or the fourth message is an EAS discovery request, and/or the first network node is a network node where a Source EES (S-EES) is deployed.

According to a fifth aspect of the present disclosure, a UE is provided. The UE comprises: a processor; a memory storing instructions which, when executed by the processor, cause the processor to perform the method of any of the fourth aspect.

According to a sixth aspect of the present disclosure, a UE is provided. The UE comprise: a transmitting module configured to transmit, to a first network node, a second message requesting an ACR, wherein the second message comprises a first parameter indicating whether the simultaneous EAS connectivity in the ACR is needed by an AC associated with the EEC or not; and a receiving module configured to receive, from the first network node, a third message comprising a third parameter indicating whether the ACR is successfully launched or not. In some embodiments, the UE comprises one or more modules configured to perform the method of any of the fourth aspect.

According to a seventh aspect of the present disclosure, a method by an EES deployed at a network node for supporting simultaneous EAS connectivity in ACR is provided. The method comprises: receiving, from a first EEC that is served by the EES, a second message requesting an ACR and indicating whether the simultaneous EAS connectivity in the ACR is needed by a first AC associated with the first EEC; requesting, towards a Core Network (CN), traffic influence for an S-EAS and/or a T-EAS indicated by the second message in response to determining that the simultaneous EAS connectivity in the ACR is needed by the first AC; and transmitting, to the first EEC, a third message indicating whether the ACR is successfully launched or not at least based on whether the requested traffic influence is successful or not.

In some embodiments, after the step of receiving the second message and before the step of requesting the traffic influence, the method further comprises: performing an authorization check on the second message, wherein the step of transmitting the third message comprises at least one of: transmitting, to the first EEC, the third message indicating whether the ACR is successfully launched or not at least based on a result of the authorization check and whether the requested traffic influence is successful or not. In some embodiments, the method further comprises: receiving, from an EAS, a fifth message for indicating whether it can function as a CAS or not; and storing, in an EAS profile for the EAS, an indicator indicating whether the EAS can function as a CAS or not at least based on the fifth message.

In some embodiments, the method further comprises: receiving, from a second EEC, a fourth message to query the network node for one or more T-EASs for selection by the second EEC and/or a second AC associated with the second EEC, wherein the fourth message comprises a first parameter indicating whether the simultaneous EAS connectivity in ACR is needed by the second AC or not, wherein the second EEC is the first EEC or the second EEC is not the first EEC.

In some embodiments, the method further comprises: receiving, from a second EEC, a fourth message to query the network node for one or more T-EASs for selection by the second EEC and/or a second AC associated with the second EEC, wherein the fourth message comprises a fourth parameter indicating whether an early T-EAS connection is needed by the AC or not, wherein the second EEC is the first EEC or the second EEC is not the first EEC. In some embodiments, the method further comprises: receiving, from a second EEC, a fourth message to query the network node for one or more T-EASs for selection by the second EEC and/or a second AC associated with the second EEC, wherein the fourth message comprises a fifth parameter indicating whether a T-EAS with CAS support is needed by the AC or not, wherein the second EEC is the first EEC or the second EEC is not the first EEC.

In some embodiments, the method further comprises: determining one or more T-EASs that can function as CASs at least based on their EAS profiles when the fourth message comprises an indicator indicating that the simultaneous EAS connectivity in ACR is needed by the AC; and transmitting, to the second EEC, a message indicating the one or more T-EASs at least based on the determination. In some embodiments, the method further comprises: determining one or more T-EASs that can and/or cannot function as CASs at least based on their EAS profiles when the fourth message comprises an indicator indicating that the simultaneous EAS connectivity in ACR is not needed by the AC; and transmitting, to the second EEC, a message indicating the one or more T-EASs at least based on the determination. In some embodiments, the second message is an ACR request for requesting an ACR from an S-EAS to a T-EAS for the AC, and the third message is an ACR response, and/or the fourth message is an EAS discovery request, and/or the fifth message is an EAS registration request.

According to an eighth aspect of the present disclosure, a network node is provided. The network node comprises: a processor; a memory storing instructions which, when executed by the processor, cause the processor to perform the method of any of the seventh aspect.

According to a ninth aspect of the present disclosure, a network node is provided. The network node comprise: a receiving module configured to receive, from a first EEC that is served by the EES, a second message requesting an ACR and indicating whether the simultaneous EAS connectivity in the ACR is needed by a first AC associated with the first EEC; a requesting module configured to request, towards a CN, traffic influence for an S-EAS and/or a T-EAS indicated by the second message in response to determining that the simultaneous EAS connectivity in the ACR is needed by the first AC; and a transmitting module configured to transmit, to the first EEC, a third message indicating whether the ACR is successfully launched or not at least based on whether the requested traffic influence is successful or not. In some embodiments, the network node comprises one or more modules configured to perform the method of any of the seventh aspect.

According to a tenth aspect of the present disclosure, a method at an EAS deployed at a network node for supporting simultaneous EAS connectivity in ACR is provided. The method comprises: transmitting, to an EES, a fifth message for indicating whether it can function as a CAS when simultaneous EAS connectivity in ACR is needed by an AC deployed at a UE or not.

In some embodiments, the method further comprises: serving the AC even when the UE is located outside of the service area of the EAS if the EAS can function as a CAS when the simultaneous EAS connectivity in ACR is needed by the AC. In some embodiments, the fifth message is an EAS registration request.

According to an eleventh aspect of the present disclosure, a network node is provided. The network node comprises: a processor; a memory storing instructions which, when executed by the processor, cause the processor to perform the method of any of the tenth aspect.

According to a twelfth aspect of the present disclosure, a network node is provided. The network node comprise: a transmitting module configured to transmit, to an EES, a fifth message for indicating whether it can function as a CAS when simultaneous EAS connectivity in ACR is needed by an AC deployed at a UE or not. In some embodiments, the network node comprises one or more modules configured to perform the method of any of the tenth aspect.

According to a thirteenth aspect of the present disclosure, a computer program comprising instructions is provided. The instructions, when executed by at least one processor, cause the at least one processor to carry out the method of any of the first, fourth, seventh, and tenth aspects.

According to a fourteenth aspect of the present disclosure, a carrier containing the computer program of the thirteenth aspect is provided. In some embodiments, the carrier is one of an electronic signal, optical signal, radio signal, or computer readable storage medium.

According to a fifteenth aspect of the present disclosure, a telecommunications system is provided. The telecommunications system comprises: one or more UEs of the second, third, fifth, and/or sixth aspects; at least one network node of the eighth and/or ninth aspects; and one or more network nodes of the eleventh and/or twelfth aspects.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and therefore are not to be considered limiting of its scope, the disclosure will be described with additional specificity and detail through use of the accompanying drawings.

FIG. 4 is a diagram illustrating an exemplary ACR procedure according to an embodiment of the present disclosure.

DETAILED DESCRIPTION

Figure 1:
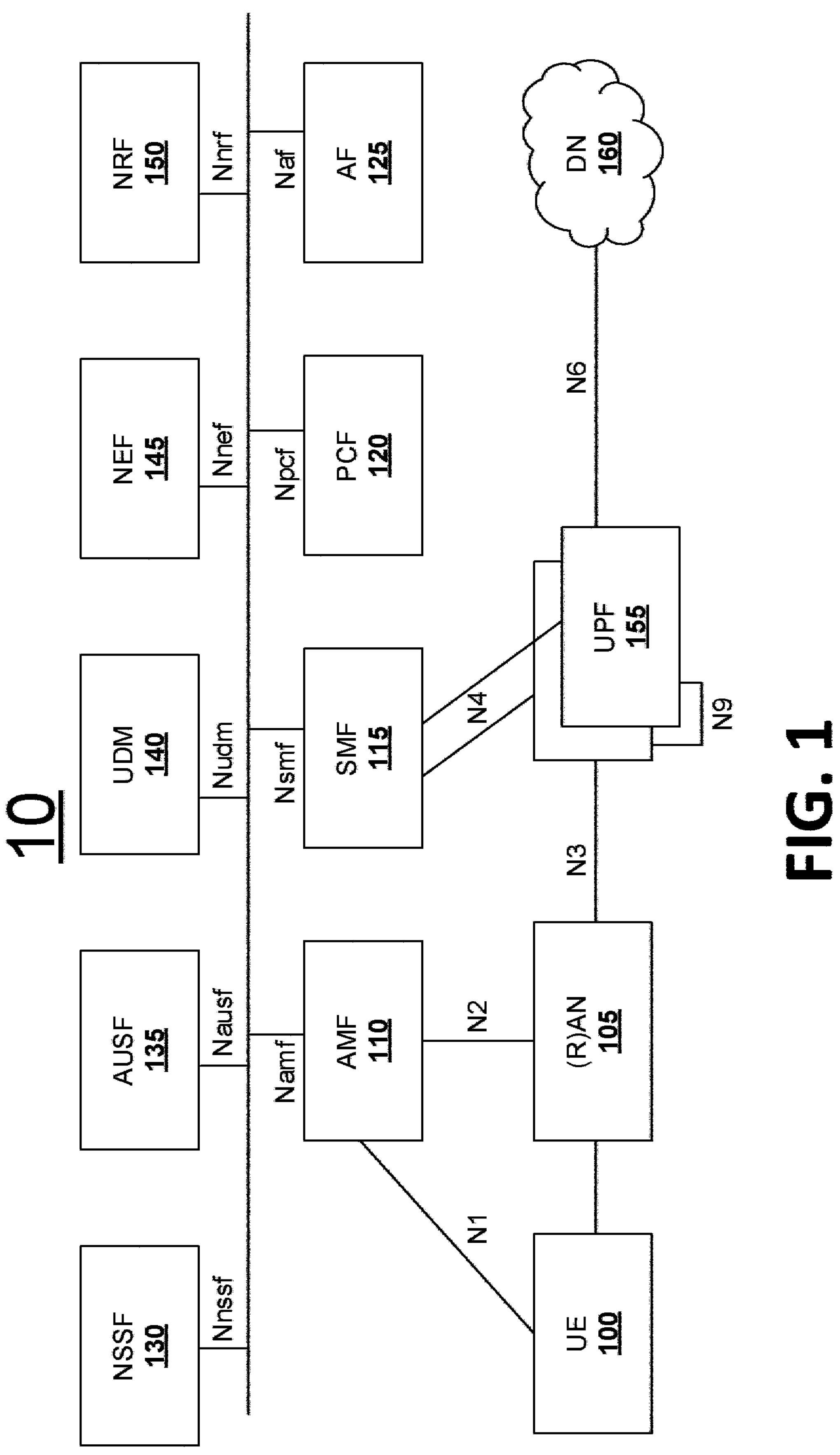
FIG. 1 is a block diagram illustrating an exemplary telecommunications network in which support for simultaneous EAS connectivity in ACR according to an embodiment of the present disclosure may be applicable.

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Those skilled in the art will appreciate that the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Conditional language used herein, such as "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below. In addition, language such as the phrase "at least one of X, Y and Z," unless specifically stated otherwise, is to be understood with the context as used in general to convey that an item, term, etc. may be either X, Y, or Z, or a combination thereof.

The terminology used herein is for the purpose of describing particular embodiments only and is not intended to be limitation of example embodiments. As used herein, the singular forms "a", "an", and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect(s)," "connecting", "connected", etc. when used herein, just mean that there is an electrical or communicative connection between two elements and they can be connected either directly or indirectly, unless explicitly stated to the contrary.

Of course, the present disclosure may be carried out in other specific ways than those set forth herein without departing from the scope and essential characteristics of the disclosure. One or more of the specific processes discussed below may be carried out in any electronic device comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure will be illustrated in the accompanying Drawings and described in the following Detailed Description, it should be understood that the disclosure is not limited to the disclosed embodiments, but instead is also capable of numerous rearrangements, modifications, and substitutions without departing from the present disclosure that as will be set forth and defined within the claims.

Further, please note that although the following description of some embodiments of the present disclosure is given in the context of 5G New Radio (NR), the present disclosure is not limited thereto. In fact, as long as support for simultaneous EAS connectivity or concurrent connections to multiple EASs is involved, the inventive concept of the present disclosure may be applicable to any appropriate communication architecture, for example, to Global System for Mobile Communications (GSM)/General Packet Radio Service (GPRS), Enhanced Data Rates for GSM Evolution (EDGE), Code Division Multiple Access (CDMA), Wideband CDMA (WCDMA), Time Division-Synchronous CDMA (TD-SCDMA), CDMA2000, Worldwide Interoperability for Microwave Access (WiMAX), Wireless Fidelity (Wi-Fi), Long Term Evolution (LTE), 5G NR, etc. Therefore, one skilled in the arts could readily understand that the terms used herein may also refer to their equivalents in any other infrastructure. For example, the term "User Equipment" or "UE" used herein may refer to a mobile device, a mobile terminal, a mobile station, a user device, a user terminal, a wireless device, a wireless terminal, an IoT device, a vehicle, or any other equivalents. For another example, the term "network node" used herein may refer to a base station, a base transceiver station, an access point, a hot spot, a NodeB (NB), an evolved NodeB (eNB), a gNB, a network element, a network function, or any other equivalents.

Further, although some embodiments of the present disclosure are described in the context of 3GPP edge computing technology, they may also be applicable to other architectures for edge computing, such as ETSI MEC or the like.

Further, please note that when a same indicator, a parameter, a field, or an Information Element (IE) is described herein as being comprised, carried, or indicated by more than one message and/or profile, it does not necessarily have a same format, a same size, a same definition, and/or a same name in the more than one message. For example, when a parameter indicating whether simultaneous EAS connectivity in ACR is needed or not is described as being comprised in a message and a profile, the parameter may actually be an IE with a name “Simultaneous EAS connectivity information in service continuity” in the profile and an IE with a name“Simultaneous EAS connectivity information” in the message. Further, the IE in the profile may further comprise or indicate one or more additional information, such as, inactive time guidance for keeping connectivity towards the S-EAS. Similarly, the IE in the message may also comprise or indicate one or more additional information, such as, inactive time guidance for keeping connectivity towards the S-EAS.

Further, following 3GPP documents are incorporated herein by reference in their entireties:

3GPP TS 23.501 V17.3.0 (2021-12), Technical Specification, 3rd Generation Partnership Project; Technical Specification Group Services and System Aspects; System architecture for the 5G System (5GS); Stage 2 (Release 17);

3GPP TS 23.548 V17.1.0 (2021-12), Technical Specification, 3rd Generation Partnership Project; Technical Specification Group Services and System Aspects; 5G System Enhancements for Edge Computing; Stage 2 (Release 17);

3GPP TS 23.558 V17.2.0 (2021-12), Technical Specification, 3rd Generation Partnership Project; Technical Specification Group Services and System Aspects; Architecture for enabling Edge Applications; (Release 17); and 3GPP TR 23.700-98 V0.4.0 (2021-12), Technical Report, 3rd Generation Partnership Project; Technical Specification Group Services and System Aspects; Study on Enhanced architecture for enabling Edge Applications; (Release 18).

FIG. 1 is a block diagram illustrating an exemplary telecommunications network 10 in which support for simultaneous EAS connectivity in ACR according to an embodiment of the present disclosure may be applicable. Although the telecommunications network 10 is a network defined in the context of 5G NR, the present disclosure is not limited thereto.

As shown in FIG. 1, the network 10 may comprise one or more UEs 100 and a (radio) access network ((R)AN) 105, which could be a base station, a Node B, an evolved NodeB (eNB), a gNB, or an AN node which provides the UEs 100 with access to other parts of the network 10. Further, the network 10 may comprise its core network portion comprising (but not limited to) an Access and Mobility Management Function (AMF) 110, a Session Management Function (SMF) 115, a Policy Control Function (PCF) 120, an Application Function (AF) 125, a Network Slice Selection Function (NSSF) 130, an Authentication Server Function (AUSF) 135, a Unified Data Management (UDM) 140, a Network Exposure Function (NEF) 145, a Network Repository Function (NRF) 150, and one or more User Plane Functions (UPFs) 155. As shown in FIG. 1, these entities may communicate with each other via the service-based interfaces, such as, Namf, Nsmf, Npcf, etc. and/or the reference points, such as, N1, N2, N3, N4, N6, N9, etc.

However, the present disclosure is not limited thereto. In some other embodiments, the network 10 may comprise additional network functions, less network functions, or some variants of the existing network functions shown in FIG. 1. For example, in a network with the 4G architecture, the entities which perform these functions (e.g., mobility management entity (MME)) may be different from those shown in FIG. 1 (e.g., the AMF 110). For another example, in a network with a mixed 4G/5G architecture, some of the entities may be same as those shown in FIG. 1, and others may be different. Further, the functions shown in FIG. 1 are not essential to the embodiments of the present disclosure. In other words, some of them may be missing from some embodiments of the present disclosure.

As shown in FIG. 1, the UPFs 155 are communicatively connected to the Data Network (DN) 160 which may be, or in turn communicatively connected to, the Internet, such that the UE 100 may finally communicate its user plane data with other devices outside the network 10, for example, via the RAN 105 and the UPFs 155.

As mentioned earlier, 3GPP proposes its own architecture of enabling edge computing. 3GPP TS 23.558 specifies the application layer architecture, procedures and information flows necessary for enabling edge applications over 3GPP networks. It includes architectural requirements for enabling edge applications, application layer architecture fulfilling the architecture requirements and procedures to enable the deployment of edge applications. An exemplary architecture for enabling edge applications is shown in FIG. 2.

Figure 2:
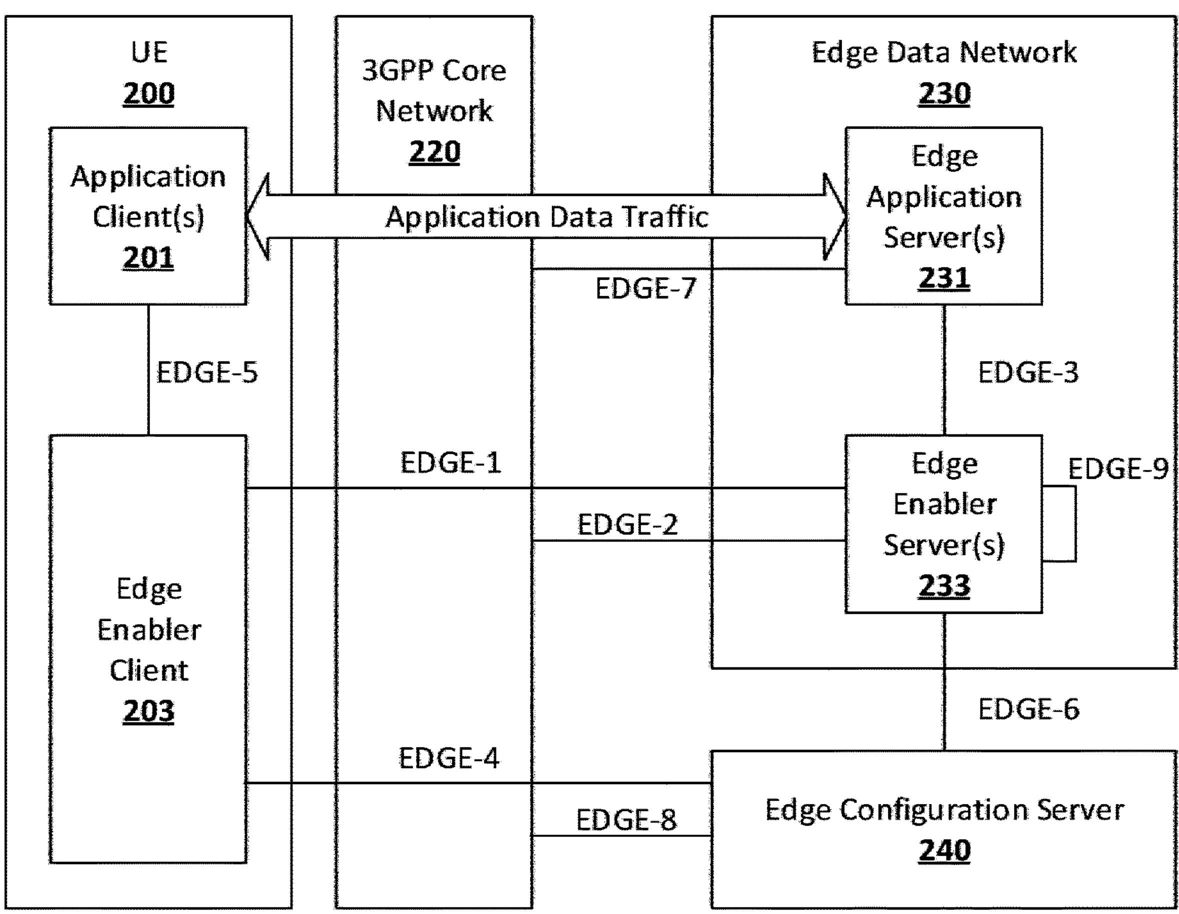
FIG. 2 is a block diagram illustrating an exemplary architecture for enabling edge applications, in which support for simultaneous EAS connectivity in ACR according to an embodiment of the present disclosure may be applicable.

FIG. 2 is a block diagram illustrating an exemplary architecture 20 for enabling edge applications, in which support for simultaneous EAS connectivity in ACR according to an embodiment of the present disclosure may be applicable. As shown in FIG. 2, one or more Application Clients (ACs) 201 deployed at a UE 200 may communicate with one or more Edge Application Servers (EASs) 231 deployed at one or more network nodes in an Edge Data Network (EDN) 230 via a 3GPP Core Network (CN) 220 (e.g., the CN part of the telecommunications network 10, comprising the AMF 110, the SMF 115, the UPF 155, or the like). Further, an Edge Enabler Client (EEC) 203 deployed at the UE 200 may communicate with one or more Edge Enabler Servers (EESs) 233 deployed at the one or more network nodes in the EDN 230 via the 3GPP CN 220 to enable the edge computing service. For example, the AC 201 may discover the one or more EAS 231 via the EEC 203 and the EES 233. Further, an Edge Configuration Server (ECS) 240 may be provided for configuring the various functional entities involved in edge computing. In some embodiments, the ECS 240 may provide configurations related to the EES 233, including details of the EDN 230 hosting the EES 233.

Please note that, although only one EDN 230 is shown in FIG. 2, the present disclosure is not limited thereto. In some embodiments, more than one EDN 230 may be provided, and one or more EASs 231 and/or one or more EESs 233 may be provided in each of the EDNs 230. In some embodiments, one or more EDNs 230 may be provided as one or more local data networks.

Next, each of the functional entities shown in FIG. 2 will be described in details below.

The AC 201 is an application resident in the UE 200 performing the client function. Depending on how ACR is implemented, the AC 201 might be required to decide whether to initiate an ACR.

The EEC 203 may provide supporting functions needed for the AC(s) 201. Some of functionalities of the EEC 203 may comprise but not limited to:

retrieval of configuration information to enable the exchange of Application Data Traffic with the EAS 231;

discovery of EASs 231 available in the EDN 230; and detecting UE mobility events.

The EES 233 may provide supporting functions needed for EASs 231 and EEC 203. Some of functionalities of the EES 233 may comprise but not limited to:

provisioning of configuration information to the EEC 203, enabling exchange of application data traffic with the EAS 231;

providing Application Programming Interface (API) invoker and API exposing functions as specified in 3GPP TS 23.222;

interacting with the 3GPP Core Network 220 for accessing the capabilities of network functions either directly (e.g. via PCF) or indirectly (i.e. Service Capability Exposure Function (SCEF)/NEF/SCEF+NEF, e.g., the NEF 145 shown in FIG. 1);

exposing events related to Application Context Transfer (ACT);

EEC context transfer between the EESs 233;

supporting external exposure of 3GPP network and service capabilities to the EAS(s) 231 over EDGE-3;

registration functions (i.e., registration, update, and de-registration) for the EEC(s) 203 and the EAS(s) 231; and triggering the EAS instantiation on demand.

The EAS 231 is the application server resident in the EDN 230, performing the server functions. The AC 201 may connect to the EAS 231 in order to avail the services of the application with the benefits of Edge Computing. It is possible that the server functions of an application are available only as an EAS 231. However, it is also possible that certain server functions are available both at the edge and in the cloud, as an EAS and an Application Server (AS) resident in the cloud respectively. The server functions offered by an EAS and its cloud Application Server counterpart may be the same or may differ; if they differ, the Application Data Traffic exchanged with the AC may also be different. Please note that the terms “Cloud AS” and “Central AS” may be used herein in an interchangeable manner and both of them can be abbreviated as “CAS” hereinafter.

The EAS 231 can consume the 3GPP Core Network capabilities in the following ways, all of which are optional to support:

invoking 3GPP Core Network capabilities via the edge enabler layer (EEL) through the EES 233;

invoking 3GPP Core Network function (e.g. PCF) APIs directly, if it is an entity trusted by the 3GPP Core Network 220; and invoking the 3GPP Core Network capabilities through the capability exposure functions i.e. SCEF/NEF/SCEF+NEF.

The ECS 240 may provide supporting functions needed for the EEC 203 to connect with an EES 233. Some of functionalities of the ECS 240 may comprise but not limited to:

provisioning of Edge configuration information to the EEC 203. The Edge configuration information includes the following:

the information for the EEC 203 to distinguish amongst the EESs 233 (e.g. EDN service area); and the information for establishing a connection with EESs 233 (such as URI);

Please note that the ECS 240 can be deployed in the Mobile Network Operator (MNO) domain or can be deployed in 3rd party domain by a service provider.

supporting the functionalities of registration (i.e., registration, update, and de-registration) for the EES(s) 233;

supporting the functionalities of API invoker and API exposing function as specified in 3GPP TS 23.222; and interacting with 3GPP Core Network for accessing the capabilities of network functions either directly (e.g. via PCF) or indirectly (i.e. SCEF/NEF/SCEF+NEF).

Next, the reference points shown in FIG. 2 will be described in details below.

EDGE-1 reference point enables interactions between the EES 233 and the EEC 203. It may support but not limited to:

registration and de-registration of the EEC 203 to the EES 233;

retrieval and provisioning of EAS configuration information; and discovery of EASs 233 available in the EDN 230.

EDGE-2 reference point enables interactions between the EES 233 and the 3GPP Core Network 220 functions and APIs for retrieval of network capability information. It may support but not limited to:

access via SCEF and NEF APIs as defined in 3GPP TS 23.501, 3GPP TS 23.502, 3GPP TS 29.522, 3GPP TS 23.682, 3GPP TS 29.122; or direct access to core network functions with the EES 233 deployed within the MNO trust domain (see 3GPP TS 23.501 clause 5.13, 3GPP TS 23.503, 3GPP TS 23.682).

Please note that EDGE-2 reference point may reuse 3GPP reference points or interfaces of EPS or 5GS considering different deployment models.

EDGE-3 reference point enables interactions between the EES 233 and the EASs 231. It may support but not limited to:

registration of EASs 231 with availability information (e.g. time constraints, location constraints);

de-registration of EASs 231 from the EES 233;

discovery of T-EAS information to support ACT;

providing access to network capability information (e.g. location information, Quality of Service (QOS) related information); and requesting the setup of a data session between the AC 201 and the EAS 231 with a specific QoS.

EDGE-4 reference point enables interactions between the ECS 240 and the EEC 203. It may support but not limited to:

provisioning of Edge configuration information to the EEC 203.

EDGE-5 reference point enables interactions between the AC(s) 201 and the EEC 203. It may support but not limited to:

registration of AC 201 with capability or requirement information (e.g. whether simultaneous EAS connectivity is supported and/or required by AC 201, whether early EAS connection is supported and/or required by AC 201, whether a central application server (CAS) is supported and/or required by AC 201);

de-registration of AC 201 from the EEC 203.

EDGE-6 reference point enables interactions between the ECS 240 and the EES 233. It may support but not limited to:

registration of EES information to the ECS 240.

EDGE-7 reference point enables interactions between the EAS 231 and the 3GPP Core Network 220 functions and APIs for retrieval of network capability information. It may support but not limited to:

access via SCEF and NEF APIs as defined in 3GPP TS 23.501, 3GPP TS 23.502, 3GPP TS 29.522, 3GPP TS 23.682, 3GPP TS 29.122; or direct access to core network functions with the EAS 231 deployed within the MNO trust domain (see 3GPP TS 23.501 clause 5.13, 3GPP TS 23.682).

Please note that EDGE-7 reference point may reuse 3GPP reference points or interfaces of EPS or 5GS considering different deployment models.

EDGE-8 reference point enables interactions between the ECS 240 and the 3GPP Core Network 220 functions and APIs for retrieval of network capability information. It may support but not limited to:

access via SCEF and NEF APIs as defined in 3GPP TS 23.501, 3GPP TS 23.502, 3GPP TS 29.522, 3GPP TS 23.682, 3GPP TS 29.122; or direct access to core network functions with the ECS 240 deployed within the MNO trust domain (see 3GPP TS 23.501 clause 5.13, 3GPP TS 23.682).

Please note that EDGE-8 reference point may reuse 3GPP reference points or interfaces of EPS or 5GS considering different deployment models.

EDGE-9 reference point enables interactions between two EESs 233. EDGE-9 reference point may be provided between EES 233 within different EDNs and/or within the same EDN.

EDGE-9 may support but not limited to:

discovery of T-EAS information to support ACR; and

EEC context relocation procedures.

When a UE (e.g., the UE 200 shown in FIG. 2) moves to a new location, different EASs (e.g., the EAS 231 shown in FIG. 2) can be more suitable for serving ACs in the UE. Further, such transitions can also result from a non-mobility event, requiring support from the enabling layer (e.g., the EEC 203 and/or the EES 233) to maintain the continuity of the service. Alternatively, the EAS may be changed due to load balancing or Operation and Maintenance (O&M) reason. The features that support service continuity for ACs in the UE to minimize service interruption while replacing the Source EAS (S-EAS) with a Target EAS (T-EAS) will be described below.

Generally, one AC on the UE has one associated application context at the S-EAS. To support service continuity, this application context may be transferred from the S-EAS to a T-EAS.

The capabilities for supporting service continuity provided at the Edge Enabler Layer may consider various application layer scenarios in which there may be involvement of AC and one or more EAS(s).

Following intra-EDN, inter-EDN and Local Area Data Network (LADN) related scenarios may be supported for service continuity:

UE mobility, including predictive or expected UE mobility; and/or

Overload situations in S-EAS or EDN; and/or

Maintenance aspects such as graceful shutdown of an EAS.

To support the need of ACR, following entity roles may be identified:

detection entity, detecting or predicting the need of ACR; and/or decision-making entity, deciding that the ACR is required; and/or execution entity, executing ACR.

Figure 3:
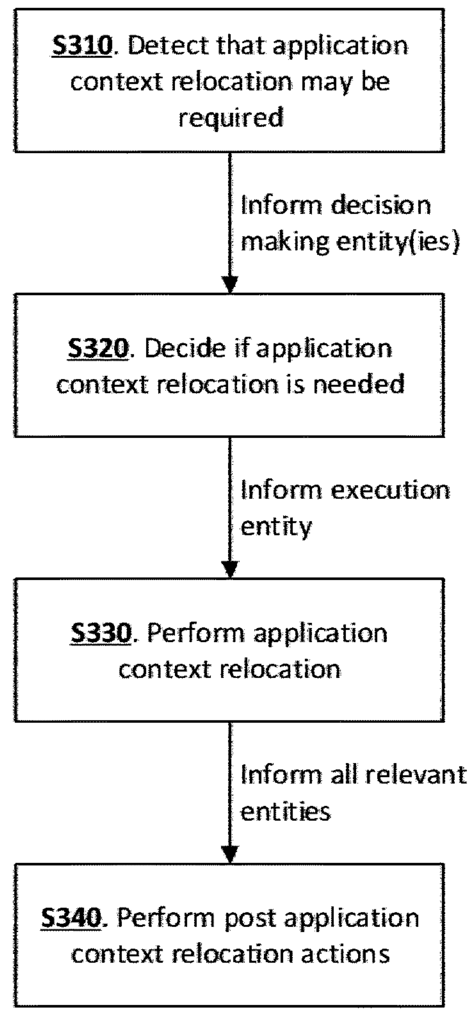
FIG. 3 is a flowchart illustrating an exemplary ACR procedure in which support for simultaneous EAS connectivity in ACR according to an embodiment of the present disclosure may be applicable.

These entities will be described with reference to FIG. 3 below. FIG. 3 is a flowchart illustrating an exemplary ACR procedure in which support for simultaneous EAS connectivity in ACR according to an embodiment of the present disclosure may be applicable.

A detection entity may detect, at step S310, the probable need for ACR by monitoring various aspects, such as UE's location or predicted/expected UE location and indicates to the decision-making entity to determine if the ACR is required. The EEC, EES and EAS can potentially perform the detection role.

A decision-making entity may determine, at step S320, that ACR is required and instructs the execution entity to perform ACR.

An execution entity may perform, at step S330, ACR as and when instructed by the decision-making entity.

Please note that after a decision that another EAS is to serve the UE, the S-EAS can decide if the existing Application Context is transferred to the new EAS.

The EAS may utilize the following capabilities provided by the EES for supporting service continuity at the application layer:

Subscribe to service continuity related events and receive corresponding notifications; and/or Discover the T-EAS; and/or ACR from a S-EAS to a T-EAS.

The EES can utilize the following capabilities provided by the ECS for supporting service continuity at the application layer:

Retrieve the T-EES.

The EEC may determine if the ACR is required by detecting that the UE moved or is predicted or expected to move outside the service area. The service area can be provided to the EEC by either the ECS during Service Provisioning or EES during EAS Discovery. For the PDU Session of Session and Service Continuity (SSC) mode 3, if the UE receives PDU Session Modification Command as specified in clause 4.3.5.2 of 3GPP TS 23.502, the EEC may determine that the ACR is required. For IPV6 multi-homed PDU Session of SSC mode 3, the EEC may determine that ACR is required if the UE is notified of the existence and availability of a new IPV6 prefix as specified in clause 4.3.5.3 of 3GPP TS 23.502.

Please note that, for IPV6 multi-homed PDU Session of SSC mode 3, the EEC can be aware of the notification about the IPV6 prefix configuration due to change of PSA UPF based on the UE implementation.

After successful ACR, some post ACR actions may be performed at S340, comprising but not limited to:

The EES may be informed of the completion by the EAS; and/or

The EEC may be informed of the completion by the EES.

In general, a number of steps may be required in order to perform ACR. The potential roles of an edge enablement layer in ACR include:

providing detection events; and/or selecting the T-EAS(s); and/or supporting the transfer of the application context from the S-EAS(s) to the T-EAS(s).

If the UE is connected to the 5GC, the EES/EAS acting as AF may utilize AF traffic influence functionality from the 3GPP CN as specified in 3GPP TS 23.502.

Further, an ACR can also be performed for service continuity planning, which means that the first three steps in FIG. 3, detection, decision and execution, may be performed as described above, e.g. when the UE is predicted to move outside the service area of the serving EAS. In such a case the T-EAS is to serve the UE when it moves to the expected location.

Service continuity planning is an Edge Enabler Layer (EEL) value-add feature of providing support for seamless service continuity, when information about planned, projected, or anticipated behavior is available at EESs or provided by EECs.

To implement this functionality, an EES may utilize:

information provided by the EEC e.g., AC Schedule, Expected AC Geographical Service Area, Expected Service KPIs, Preferred Edge Computing Service Provider (ECSP) list; and/or 3GPP core network capabilities utilized by EES as described in TS 23.558 clause 8.10.3.

In service continuity planning, the Application Context may be duplicated and sent from the S-EAS to the T-EAS before the UE moves to the expected location. In this case, the Application Contexts in S-EAS and T-EAS may be synchronized when the Application Context is updated until the AC connects to the T-EAS.

The edge computing study, 3GPP TR 23.700-98, describes several Key Issues (KIs).

Key Issue #4 EDGE-5 (Also See Clause 4.4 in TR 23.700-98)

KI #4 is about EDGE-5 interaction between AC and EEC and it mentions: Whether and how an AC registers to an EEC?

*First Change*

4.X Key issue #YY: Simultaneously EAS connectivity in ACR

In 3GPP TS 23.548 [23548], there is a use case where application client needs to connect to both S-EAS and T-EAS during service continuity. Details are specified in clause 6.3.4 and Annex F of 3GPP TS 23.548 [23548].

For AC triggered application context relocation, clause 8.8.2.2 of 3GPP TS 23.558 describes the scenario for the service continuity initiated by EEC using regular EAS discovery. In step 5 (corresponding to step S425 shown in FIG. 4), the EEC and AC jointly decides the T-EAS to be used and in step 8 (corresponding to step S440 shown in FIG. 4) the AC is triggered by the EEC to start ACT. Please refer to FIG. 4 and its description for details.

If the AC needs to connect to the T-EAS first to trigger ACT, the AC has two application sessions (or data connections) simultaneously during the service continuity. There are potential improvements in EEL to facilitate such simultaneous connectivity. For example, how to influence the application traffic to maintain both S-PSA and T-PSA during the service continuity and how to make sure that the T-EAS allows the early application traffic request from AC in service continuity planning. The latter example is related to below restriction in rel-17 where EAS rejects the early application traffic from the AC if UE is not within the EAS service area:

TABLE 4.X-1

| EAS Profile | | |
|---|---|---|
| Information element | Status | Description |
| EASID | M | The identifier of the EAS |
| EAS Endpoint | M | Endpoint information (e.g. URI, FQDN, IP address) used to communicate with the EAS. This information maybe discovered by EEC and exposed to ACs so that ACs can establish contact with the EAS. |
| . . . | . . . | . . . |
| EAS Geographical Service Area | O | The geographical service area that the EAS serves. ACs in UEs that are located outside that area shall not be served. |
| EAS Topological Service Area | O | The EAS serves UEs that are connected to the Core Network from one of the cells included in this service area. ACs in UEs that are located outside this area shall not be served. |

Key Issue #11 ACR Between EAS and Cloud Application Server (Also See Clause 4.11 in TR 23.700-98)

KI #11 is about ACR between the EAS and an AS in the central cloud. It mentions: Whether and how to perform ACR between EAS and CAS Further, there is a new KI proposed as follows.

New Key Issue #YY: Simultaneously EAS Connectivity in ACR

The following description proposes a new KI for the eEDGEAPP.

In TS 23.548 (Annex F and clause 6.3.4), there is a use case where AC needs to connect to both S-EAS and T-EAS during service continuity. The ACR is triggered by AC contacting T-EAS and the AC has two application sessions (or data connections) simultaneously. Such flow can be mapped to TS 23.558 service continuity scenario #1 Initiation by EEC using regular EAS Discovery with difference that SA6 EAS (re-) discovery method is used instead. For this type of application context relocation with simultaneous connectivity of S-EAS and T-EAS (and of course S-PSA and T-PSA), the SA6 EDGEAPP may need to be improved and investigation is needed to see how EEL can provide better service for the application.

It is proposed to agree the following changes in TS 23.700-98.

Open issues:

How EEL can influence the application traffic routing to maintain both S-PSA and T-PSA to support simultaneous connectivity with both S-EAS and T-EAS during the service continuity.

How to allow application traffic towards the T-EAS if the UE is not within the T-EAS service area.

*End of Changes*

To address the above issues, some embodiments of the present disclosure propose several new improvements:

AC profile is enhanced with new Simultaneous EAS connectivity information in service continuity; and/or AC registration procedure is added; and/or EAS profile and EAS discovery filter are enhanced with Central AS capability indication.

With some embodiments of the present disclosure, some of the open issues in KI #4 and KI #11 of TR 23.700-98 and the new KI for simultaneous EAS connectivity in ACR may be addressed.

Next, some embodiments of the present disclosure may be described in detail with reference to FIG. 4 through FIG. 7.

Figure 4:
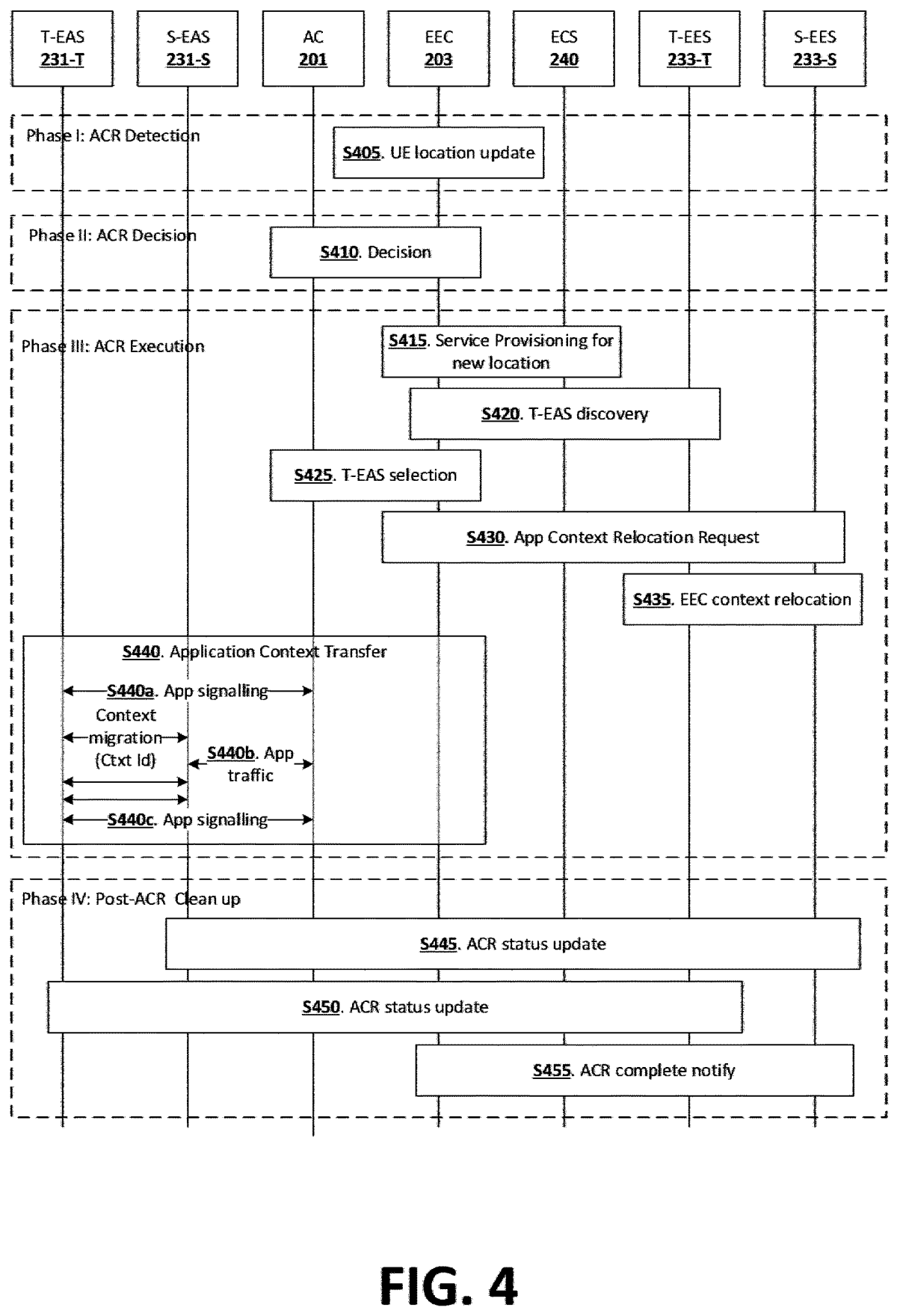

FIG. 4 is a diagram illustrating an exemplary ACR procedure according to an embodiment of the present disclosure. In the scenario shown in FIG. 4, an ACR is a result of the UE (e.g. the UE 200 shown in FIG. 2) moving to, or the UE expecting to move to, a new location which is outside the service area of the serving EAS 231-S. The EEC 203 may be triggered as a result of the UE's movement as described above.

This scenario is based on Service Provisioning and EAS Discovery procedures to discover the T-EES 233-T and T-EAS 231-T that shall serve the AC 201 as a result of the UE 200's new location, and that shall receive the Application Context from the serving EAS 231-S.

This scenario relies on an interface between the EEC 203 and the AC 201 over EDGE-5, which will be described with reference to FIG. 5.

In some embodiments, one or more of the following pre-conditions may be met before the procedure shown in FIG. 4 begins:

1. The AC 201 in the UE 200 already has a connection to a corresponding S-EAS 231-S;
2. The EEC 203 has been pre-configured or has discovered the address (e.g. URI) of the ECS 240;
3. The EEC 203 has been authorized to communicate with the ECS 240;
4. The UE Identifier is either preconfigured or resulted from a successful authorization; and
5. The ECS 240 is configured with ECSP's policy for service provisioning; and
6. The EEC 203 is triggered when it obtains the UE 200's new location or is triggered by another entity such as an ECS notification Please note that this scenario may be applicable only for an Edge-aware AC 201 and EAS 203. However, the present disclosure is not limited thereto. In some other embodiments, the inventive concepts taught in this embodiment may also be applicable to other scenarios.

Phase I: ACR Detection (Corresponding to Step S310 Shown in FIG. 3)

At step S405, the EEC 203 may detect the UE location update as a result of a UE mobility event and may be provided with the UE 200's new location. The EEC 203 can also detect an expected or predicted UE location in the future.

Please note that, if the EEC 203 is triggered by an external entity such as by a notification from the ECS 240, a list of new EESs 233 (to be used as T-EESs) may be provided by that notification and step S415 below may be skipped.

Phase II: ACR Decision (Corresponding to Step S320 Shown in FIG. 3)

At step S410, either the AC 201 or the EEC 203 or both may make the decision to perform the ACR.

Please note that which applications require ACR can be decided based on the application profile, e.g., requirement of service continuity of the application. If the change in UE 200's location does not trigger a need to change the serving EAS, steps S415 onwards may be skipped. The EEC 203 may remain connected to the serving EES(s) 233-S and the AC 201 may remain connected to its corresponding serving EAS 231-S.

Phase III: ACR Execution (Corresponding to Step S330 Shown in FIG. 3)

At step S415, the EEC 203 may perform Service Provisioning for all active applications that require ACR. Since the location of the UE 200 has changed, the Service Provisioning procedure results in a list of T-EESs 233-T that are relevant to the supplied applications and the new location of the UE 200. When in step S405 the ACR for service continuity planning is triggered, then the Connectivity information and UE Location in the Service Provisioning procedure may contain the expected Connectivity information and expected UE Location.

At step S420, the EEC 203 may perform EAS discovery for the desired T-EASs 231-T by querying the T-EESs 233-T that were established in step S415 (or provided in the notification from the ECS 240—if it was the trigger). If EEC registration configuration for the EESs 233 established in step S410 indicates that EEC registration is required, the EEC 203 may perform EEC registration with the EESs 233 before sending the EAS discovery request. Step S425 may be skipped if EAS discovery procedure results in only one discovered T-EAS 231-T.

At step S425, the AC 201 and EEC 203 may select the T-EAS 231-T to be used for the application traffic.

Please note that several EEC registrations with different EESs 233 may result from T-EAS discovery process during a single ACR operation.

At step S430, the EEC 203 may perform ACR launching procedure (as will be described with reference to FIG. 6) to the S-EES 233-S with the ACR action indicating ACR initiation and the corresponding ACR initiation data (without the need to notify the EAS 231-S). The S-EES 233-S may apply the AF traffic influence with the N6 routing information of the T-EAS 231-T in the 3GPP Core Network 220 (if applicable). If the EEC 203 has not subscribed to receive ACR information notifications for ACR complete events from the S-EES 233-S, the EEC 203 may subscribe for the notifications.

At step S435, if the T-EES 233-T is different than the S-EES 233-S and the EEC Context at the S-EES 233-S is not stale, the S-EES 233-S may initiate EEC Context Push relocation with the T-EES 233-T. Otherwise, if the T-EES 233-T is the same as the S-EES 233-S, EEC Context Push relocation may be skipped.

At step S440, the AC 201 may be triggered by the EEC 203 to start an Application Context Transfer (ACT) procedure. The AC 201 may decide to initiate the transfer of application context from the S-EAS 231-S to the T-EAS 231-T.

New L4 connections may now be established between the UE 200 and the target EAS 231-T. EAS Relocation may involve EAS context migration in the case of stateful applications. In some embodiments, the T-EAS 231-T may recreate the service context when first contacted by the AC 201 using a Context Id: when suitable, the AC 201 may set up a connection to the T-EAS 231-T including a Context Id, for example, at step S440*a*. The T-EAS 231-T may then use this Context Id to retrieve, from the S-EAS 231-S the latest service context available and subsequent updates, if needed, as shown by the arrows next to the step S440*b*.

Additionally or alternatively, the T-EAS 231-T may recreate the context when first contacted by the AC 201 using a Context Id: the AC 201 may set up a connection to the T-EAS 231-T but for some time it sends traffic to both S-EAS 231-S and T-EAS 231-T. In this way it triggers the context migration before the actual EAS switch.

As shown in FIG. 4, the AC 201 may keep communicate with the S-EAS 231-S for its ongoing application traffic at step S440*b* while the T-EAS 231-T is retrieving or creating the application context for the AC 201. Once the application context is retrieved or created, the T-EAS 231-T may notify the AC 201 of the complete of the application context migration at step S440*c*, and communicate with the AC 201 for subsequent application traffic.

In some embodiments where service continuity planning is used for the UE 200, the T-EAS 231-T won't communicate with the UE 200 until the UE 200 reaches the expected/predicted location, for example, when T-EAS 231-T is not configured as a CAS. In some embodiments where service continuity planning is used for the UE 200, the T-EAS 231-T can communicate with the UE 200 even when the UE 200 does not reach the expected/predicted location, for example, when T-EAS 231-T is configured as a CAS.

As shown in FIG. 4, the S-EAS 231-S may be responsible for transmitting/receiving application traffic to/from the AC 201 during the ACT procedure. However, the present disclosure is not limited thereto. In some other embodiments, at least one of the T-EAS 231-T and the S-EAS 231-S may be responsible for transmitting/receiving application traffic to/from the AC 201 during the ACT procedure. For example, the T-EAS 231-T may be responsible for transmitting/receiving application traffic to/from the AC 201 during the ACT procedure. For another example, the S-EAS 231-S may be responsible for transmitting application traffic to the AC 201 while the T-EAS 231-T may be responsible for receiving application traffic from the AC 201 during the ACT procedure, or vice versa. For yet another example, the S-EAS 231-S may be responsible for transmitting/receiving application traffic to/from the AC 201 before a certain time point in the ACT procedure, and the T-EAS 231-T may be responsible for transmitting/receiving application traffic to/from the AC 201 after the certain time point. For a further example, the S-EAS 231-S may be responsible for transmitting/receiving application traffic to/from the AC 201 before the UE 200 reaches a certain location (e.g., a location related to or not related to the service areas of the S-EAS 231-S and/or T-EAS 231-T), and the T-EAS 231-T may be responsible for transmitting/receiving application traffic to/from the AC 201 after the UE 200 reaches the certain location.

When in step S405 the ACR for service continuity planning has been triggered, the AC 201 may connect to the T-EAS 231-T when the UE 200 moves to the predicted location. Otherwise, the rest of this step may be skipped.

After the ACT procedure is completed, the AC 201 may remain connected to the T-EAS 231-T and disconnect from the S-EAS 231-S. Further, the EEC 203 may be informed of the completion.

When in step S405 the ACR has been triggered for service continuity planning, if the UE 200 does not move to the expected/predicted location the EEC 203 does not connect to T-EES 233-T, the AC 201 does not connect to the T-EAS 231-T. Post-ACR Clean-up may be skipped.

Please note that the S-EAS 231-S or T-EAS 231-T can further decide to terminate the ACR, and the T-EAS 231-T can discard the application context based on information received from EEL and/or other methods (e.g. monitoring the location of the UE 200). It is up to the implementation of the S-EAS 231-S and T-EAS 231-T whether and how to make such a decision.

When in step S405 the ACR for service continuity planning is triggered, Post-ACR Clean up may be performed after the UE 200 moves to the predicted location.

Phase IV: Post-ACR Clean Up (Corresponding to Step S340 Shown in FIG. 3)

At step S445, the S-EAS 231-S may send the ACR status update message to the S-EES 233-S.

At step S450, the T-EAS 231-T may send the ACR status update message to the T-EES 233-T. If the status indicates a successful ACT, and that the EEC Context relocation procedure was attempted but failed, then the T-EES 233-T indicates the failure to the T-EAS 231-T with the ACR status update response.

Please note that if the EDGE-3 subscription initialization result indicates failure, then the T-EAS 231-T can perform the required EDGE-3 subscriptions at the T-EES 233-T.

Please note that steps S445 and S450 can occur in any order.

At step S455, if the status in step S445 indicates a successful ACT, the S-EES 233-S may send the ACR information notification (ACR complete) message to the EEC 203 to confirm that the ACR has completed. If the EEC Context relocation procedure was attempted, then the notification may include EEC context relocation status IE, indicating the result of the EEC context relocation procedure. If the EEC context relocation status indicates that the EEC context relocation was not successful, then the EEC 203 may perform the required EDGE-1 operations such as create subscriptions at the T-EES 233-T.

With the above embodiment shown in FIG. 4, the simultaneous EAS connectivity in ACR may be supported, and QoE during EAS switching may be ensured, especially in highly mobile, low latency scenario, such as connected vehicles or XR.

As clearly shown above, the EEL may take care of the AF (e.g., the AC 201) request for requesting simultaneous connectivity over the source and target PSA (related to S-EAS 231-S and T-EAS 231-T) during Edge relocation. In some embodiments, to support simultaneous EAS connectivity in ACR, at least one of the EAS profile (which is registered into the EES) and EAS discovery filter may be updated with central AS support indication.

Some embodiments of the present disclosure may also address KI #4 and KI #11 mentioned above.

It is proposed to agree the following changes in TS 23.700-98.

*First Change*

7.x Solution #XX: Support simultaneous EAS connectivity in ACR 7.x.1 Architecture enhancements None.

7.x.2 Solution description 7.x.2.1 Solution for traffic influence

To solve the issue about traffic influence to maintain both S-PSA and T-PSA to support simultaneous connectivity with both S-EAS and T-EAS during the service continuity, the AC includes the need for simultaneous EAS connectivity in the AC profile and the AC profile is sent to EEC via EDGE-5 reference point so that the EEC can request such need in the ACR request sent to EES. Then the EES, at the time of requesting traffic influence towards 3GPP CN, provides additional requirement for simultaneous PSA connectivity as described in clause 6.3.4 of 3GPP TS 23.548 [23548].

Figure 5:
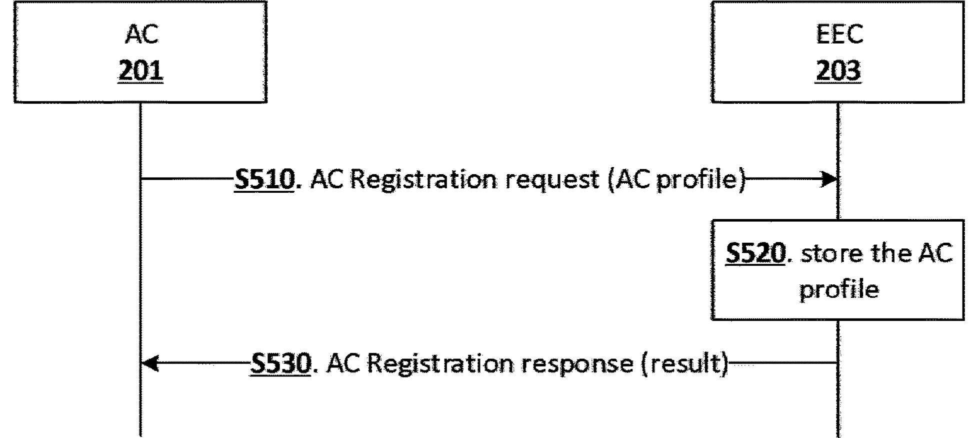
FIG. 5 is a diagram illustrating an exemplary AC registration procedure according to an embodiment of the present disclosure.

FIG. 5 describes the detailed interaction between the AC 201 and EEC 203 for AC registration procedure.

At step S510, the AC 201 may send an AC registration request to the EEC 203, and the request may include the AC profile (see table 1 below).

At step S520, the EEC 203 may authorize the AC registration request and stores the AC profile.

At step S530, the AC 201 may be responded with an AC registration response (success/failure).

TABLE 1

| AC Profile | | |
|---|---|---|
| Information element | Status | Description |
| ACID | M | Identity of the AC. |
| AC Type | O | The category or type of AC (e.g. V2X). This is an implementation specific value. |
| Preferred ECSP list | O | When used in a service provisioning request, this IE indicates to the ECS which ECSPs are preferred for the AC. The ECS may use this information in the selection of EESs. |
| AC Schedule | O | The expected operation schedule of the AC (e.g. time windows) |
| Expected AC Geographical Service Area | O | The expected location(s) (e.g. route) of the hosting UE during the AC's operation schedule. This geographic information can express a geographic point, polygon, route, signalling map, or waypoint set. |
| AC Service Continuity Support | O | Indicates if service continuity support is required or not for the application. The IE also indicates which ACR scenarios are supported by the AC and which of these are preferred by the AC. |
| Simultaneous EAS connectivity information in service continuity | O | Indicates if simultaneous EAS connectivity is needed and the inactive time guidance for keeping connectivity towards the S-EAS. |
| List of EASs | O | List of EAS that serve the AC along with the service KPIs required by the AC |
| >EASID | M | Identifier of the EAS |
| >Expected AC Service KPIs | O | KPIs expected in order for ACs to receive currently required services from the EAS |
| >Minimum required AC Service KPIs | O | Minimum KPIs required in order for ACs to receive meaningful services from the EAS |

Figure 6:
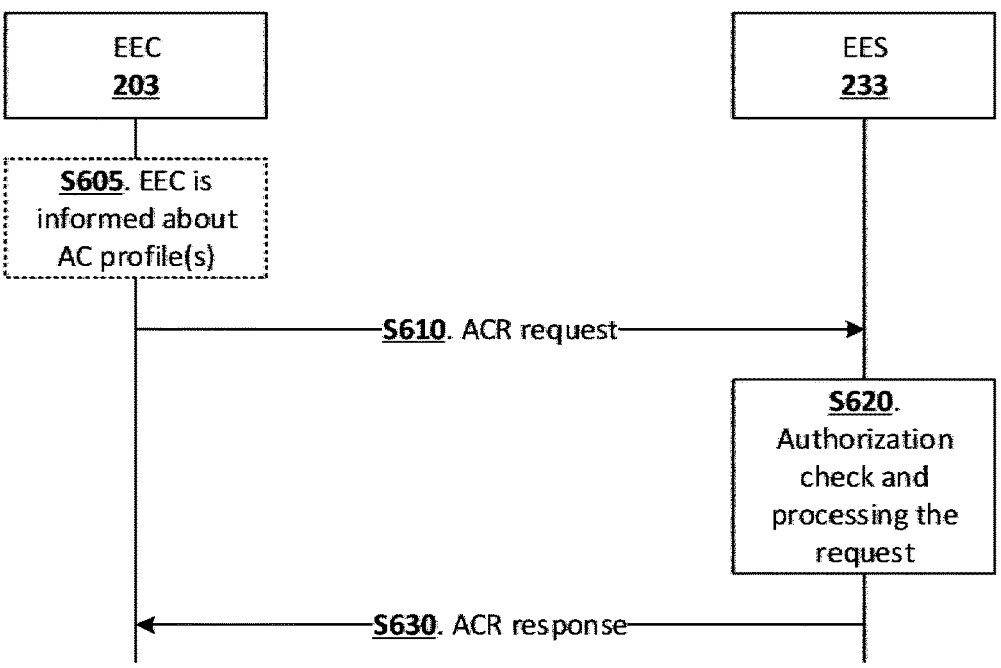
FIG. 6 is a diagram illustrating an exemplary ACR launching procedure according to an embodiment of the present disclosure.

FIG. 6 describes the detailed interaction between the EEC 203 and the EES 233 during service continuity (i.e. ACR).

At step S605, the EEC 203 may be informed about AC profiles (e.g. during an AC registration procedure as depicted in FIG. 5).

At step S610, the EEC 203 may trigger an ACR request (type: initiation) to the EES 233, and the request may include the simultaneous EAS connectivity information in service continuity (see table 2 below) which was previously received as part of the AC profile (see table 1).

At step S620, the EES 233 may authorize the ACR request. Then the EES 233 may use information provided in the request to apply the AF traffic influence with the N6 routing information of the T-EAS 231-T (and/or S-EAS 231-S) and simultaneous EAS connectivity information in the 3GPP Core Network (if applicable).

Please note that since the 3GPP CN only supports simultaneous PSA connectivity in SSC mode 3 or session breakout, it is for further study (FFS) whether the EES 233 should firstly know PDU session capability before invoking AF traffic influence API.

At step S630, the EEC 203 may be responded with an ACR response (success/failure).

TABLE 2

| ACR request | | |
|---|---|---|
| Information element | Status | Description |
| Requestor Identifier | M | Unique identifier of the requestor (i.e. EECID or EASID). |
| Security credentials | M | Security credentials resulting from a successful authorization for the edge computing service. |
| EASID | O | Identifier of the EAS |
| UE identifier | O | The identifier of the UE (i.e. GPSI). |
| ACID | O | The identifier of the AC. |
| ACR action | M | Indicates the ACR action (ACR initiation or ACR determination) |
| ACR initiation data | O | ACR initiation IEs to be included in an ACR request message when ACR action indicates it is ACR initiation request. |
| >T-EAS Endpoint | M | Endpoint information (e.g. URI, FQDN, IP 3-tuple) of the T-EAS. |
| >Previous T-EAS Endpoint (NOTE 7) | O | Endpoint information (e.g. URI, FQDN, IP 3-tuple) of the T-EAS of the previous ACR. |
| >DNAI of the T-EAS | O | DNAI information associated with the T-EAS. |
| >N6 Traffic Routing requirements | O | The N6 traffic routing information and/or routing profile ID corresponding to the T-EAS DNAI. |
| >Simultaneous EAS connectivity information | O | Indicates if simultaneous EAS connectivity is needed and the inactive time guidance for keeping connectivity towards the S-EAS. |

TABLE 2-continued

| ACR request | | |
|---|---|---|
| Information element | Status | Description |
| >EAS notification indication | M | Indicates whether to notify the EAS about the need of ACR. |
| . . . | . . . | . . . |
| >S-EAS endpoint | O | Endpoint information of the S-EAS |
| ACR determination data | O | ACR determination IEs to be included in an ACR request message when ACR action indicates it is ACR determination request. |
| > S-EAS endpoint | M | Endpoint information of the S-EAS |

Figure 7:
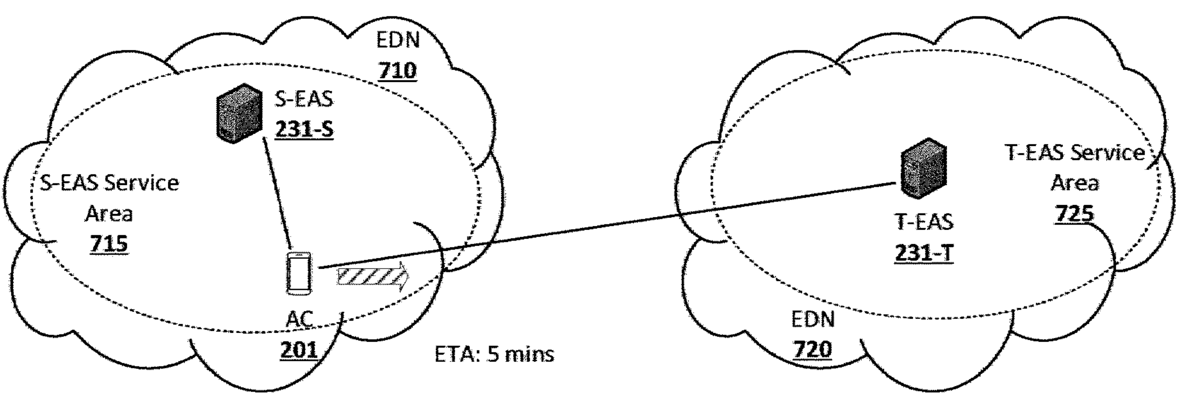
FIG. 7 is a diagram illustrating an exemplary scenario in which a UE moves from an EDN to another EDN with support for simultaneous EAS connectivity in ACR according to an embodiment of the present disclosure.

Further, the EAS (e.g., the T-EAS 231-T), by definition, is an edge application server. FIG. 7 illustrates the case when the UE 200 is going to move out of the current EDN 710 and is estimated to arrive the destination within another EDN 720 in 5 minutes. The UE 200's application traffic may need to be sent to the target EAS 231-T in the other EDN 720 in order to trigger application context transfer.

Please note that the service areas 715/725 of the two EDNs 710/720 can have overlapping area and the UE 200 can start service continuity planning before entering the overlapping area.

This case is similar with UE application traffic being sent to a center application server (CAS). From service perspective, the EAS may be providing the same application service to the application client just like a CAS. Whether an AS is an EAS or a CAS is very much depending on the geographical or topological distance between the UE 200 and AS.

To solve the issue when Application traffic is rejected by the T-EAS 231-T if the UE 200 is not within the T-EAS service area 725, the EAS service area (both geographical service area and topological service area) restriction can be bypassed if the EAS can serve as a CAS.

TABLE 3

| EAS Profile | | |
|---|---|---|
| Information element | Status | Description |
| EASID | M | The identifier of the EAS |
| EAS Endpoint | M | Endpoint information (e.g. URI, FQDN, IP address) used to communicate with the EAS. This information maybe discovered by EEC and exposed to ACs so that ACs can establish contact with the EAS. |
| . . . | . . . | . . . |
| EAS Geographical Service Area | O | The geographical service area that the EAS serves. ACs in UEs that are located outside that area shall not be served. |
| EAS Topological Service Area | O | The EAS serves UEs that are connected to the Core Network from one of the cells included in this service area. ACs in UEs that are located outside this area shall not be served. |
| Central AS support indication | O | It indicates whether the EAS serves as a Central AS. If it is CAS, the EAS Service Area is not applicable.<br>Default value is edge (i.e. no central capability) if omitted. |

Correspondingly, to find a suitable EAS that can serve as CAS during service continuity, the EEC triggered EAS discovery procedure needs to include a central AS required indication set to required or true as EAS discovery filter in table 4.

TABLE 4

| EAS discovery filters | | |
|---|---|---|
| Information element | Status | Description |
| List of AC characteristics (NOTE 1) | O | Describes the ACs for which a matching EAS is needed. |
| >AC profile (NOTE 2) | M | AC profile containing parameters used to determine matching EAS. |
| List of EAS characteristics (NOTE 1, NOTE 3) | O | Describes the characteristic of required EASs. |
| >EASID | O | Identifier of the required EAS. |
| >EAS provider identifier | O | Identifier of the required EAS provider |
| . . . | . . . | . . . |
| >Central AS required indication | O | Indicates whether a CAS is required to be discovered. |

Therefore, some embodiments of the present disclosure may address KI #4 about "Whether and how an AC registers to an EEC". During the AC registration, the AC may be able to indicate its desire for keeping simultaneous EAS connectivity. Further, some embodiments of the present disclosure may address KI #XX about traffic influence and/or T-EAS access restriction. Furthermore, some embodiments of the present disclosure may address KI #11 for the ACR between an EAS and CAS.

In a deployment, some or all Application Servers can claim the central capability support. For instance, if an AS is only available in a certain area (e.g. a shopping mall or campus), such an AS needs to restrict the application connectivity only when the UE is within the edge; otherwise the AS can also support access from a far-end UE.

*End of Changes*

Further, please note that although parameters "Simultaneous EAS connectivity information in service continuity", "Simultaneous EAS connectivity information", "Central AS support indication", and "Central AS required indication" are given in Table 1 through Table 4 as examples, the present disclosure is not limited thereto. In some other embodiments, one or more other parameters may be provided for indicating or requesting similar information. In some embodiments, one or more of the parameters, "whether simultaneous EAS connectivity in ACR is needed or not", "whether an early T-EAS connection is needed or not", and "whether a T-EAS with CAS support is needed or not" may be used to indicate whether a corresponding feature is supported or requested or not.

Further, one of the parameters may be used to implicitly indicate one or more other parameters. For example, the parameters "whether simultaneous EAS connectivity in ACR is needed or not", "whether an early T-EAS connection is needed or not", and "whether a T-EAS with CAS support is needed or not" actually correspond to different features. For example, when an early T-EAS connection is needed, it does not mean that the T-EAS must function as a CAS without service area restriction. In some cases, the T-EAS may have an infinite service area of a CAS or a large, but not infinite, service area during an ACR procedure and a smaller service area for other time. In other words, the T-EAS may also function as a CAS that has no restriction or less restriction in its service area than an EAS. For another example, when simultaneous EAS connectivity in ACR is needed, it does not mean that an early T-EAS connection is inevitable. Instead, the S-EAS may provide a late S-EAS connection for the UE, for example, when the S-EAS also functions as a CAS.

In some embodiments, when one of them is explicitly signaled, the rest of the parameters may be implicitly signaled. For example, when the parameter "whether a T-EAS with CAS support is needed or not" is signaled, then it may explicitly indicate whether a T-EAS with CAS support is needed or not, while implicitly indicate "whether simultaneous EAS connectivity in ACR is needed or not" and/or "whether an early T-EAS connection is needed or not", and vice versa.

Further, please note that although, in the embodiments above, the support for simultaneous EAS connectivity may be required during an ACR procedure, the present disclosure is not limited thereto. In some other embodiments, the support for simultaneous EAS connectivity may be required by any other procedure. For example, in order to achieve a higher data rate, a UE may be served by multiple EASs simultaneously even if the UE is not moving and stays only in a service area of a single EAS. In such a case, the concepts provided in the embodiments of the present disclosure may also be applicable.

Figure 8:
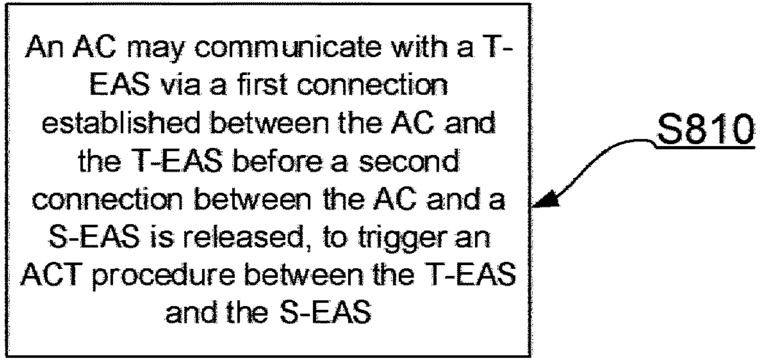
FIG. 8 is a flow chart illustrating an exemplary method by an AC deployed at a UE for supporting simultaneous EAS connectivity in ACR according to an embodiment of the present disclosure.

FIG. 8 is a flow chart of an exemplary method 800 by an AC deployed at a UE for supporting simultaneous EAS connectivity in ACR according to an embodiment of the present disclosure. The method 800 may be performed by an AC deployed at a UE (e.g., the AC 201 at the UE 200). The method 800 may comprise step S810. However, the present disclosure is not limited thereto. In some other embodiments, the method 800 may comprise more steps, different steps, or any combination thereof. Further the steps of the method 800 may be performed in a different order than that described herein. Further, in some embodiments, a step in the method 800 may be split into multiple sub-steps and performed by different entities, and/or multiple steps in the method 800 may be combined into a single step.

The method 800 may begin at step S810 where the AC may communicate with a T-EAS via a first connection established between the AC and the T-EAS before a second connection between the AC and an S-EAS is released, to trigger an ACT procedure between the T-EAS and the S-EAS.

In some embodiments, application traffic from the AC may be received by at least one of the S-EAS and the T-EAS during the ACT procedure; and/or application traffic to the AC may be transmitted by at least one of the S-EAS and the T-EAS during the ACT procedure. In some embodiments, at least one of following may be true: the application traffic from the AC may be received by the T-EAS when the UE is located outside of the service area of the T-EAS; the application traffic to the AC may be transmitted by the T-EAS when the UE is located outside of the service area of the T-EAS; the application traffic from the AC may be received by the S-EAS when the UE is located outside of the service area of the S-EAS; and the application traffic to the AC may be transmitted by the S-EAS when the UE is located outside of the service area of the S-EAS.

In some embodiments, before the step of communicating with the T-EAS, the method 800 may further comprise: transmitting, to an EEC associated with the AC, a first message comprising a first parameter indicating whether simultaneous EAS connectivity in ACR is needed by the AC or not. In some embodiments, the first message may further comprise a second parameter indicating inactive time guidance for keeping connectivity towards the S-EAS when the first parameter indicates that the simultaneous EAS connectivity in ACR is needed by the AC. In some embodiments, before the step of communicating with the T-EAS, the method 800 may further comprise: triggering the EEC to transmit, to an EES deployed in a first network node, a second message requesting an ACR, wherein the second message may comprise the first parameter and/or the second parameter. In some embodiments, the first message may be an AC registration request for registering the AC with the EEC, and/or the second message may be an ACR request for requesting an ACR from the S-EAS to the T-EAS for the AC.

Figure 9:
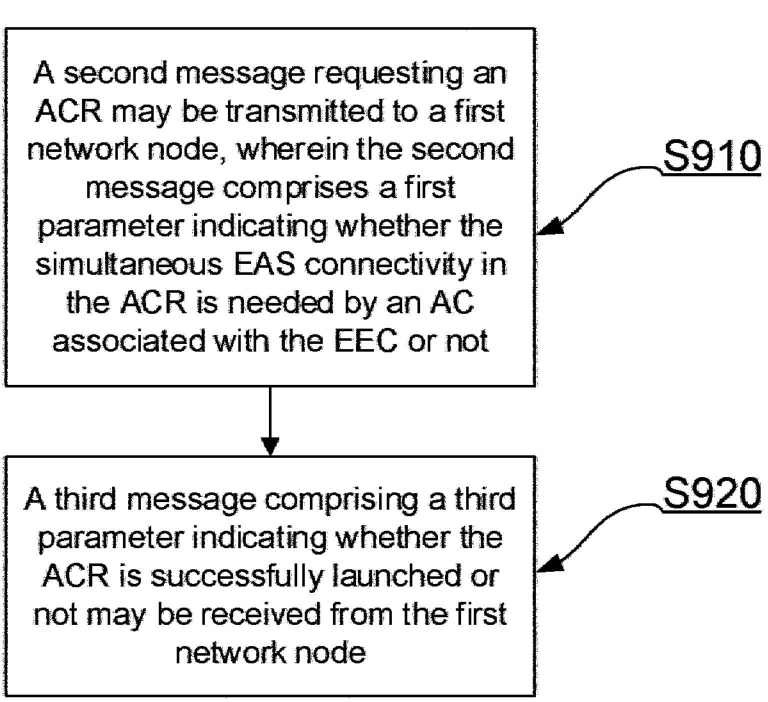
FIG. 9 is a flow chart illustrating an exemplary method by an EEC deployed at a UE for supporting simultaneous EAS connectivity in ACR according to an embodiment of the present disclosure.

FIG. 9 is a flow chart of an exemplary method 900 by an EEC deployed at a UE for supporting simultaneous EAS connectivity in ACR according to an embodiment of the present disclosure. The method 900 may be performed by an EEC deployed at a UE (e.g., the EEC 203 at the UE 200). The method 900 may comprise steps S910 and S920. However, the present disclosure is not limited thereto. In some other embodiments, the method 900 may comprise more steps, less steps, different steps, or any combination thereof. Further the steps of the method 900 may be performed in a different order than that described herein. Further, in some embodiments, a step in the method 900 may be split into multiple sub-steps and performed by different entities, and/or multiple steps in the method 900 may be combined into a single step.

The method 900 may begin at step S910 where a second message requesting an ACR may be transmitted to a first network node. In some embodiments, the second message may comprise a first parameter indicating whether the simultaneous EAS connectivity in the ACR is needed by an AC associated with the EEC or not.

At step S920, a third message comprising a third parameter indicating whether the ACR is successfully launched or not may be received from the first network node.

In some embodiments, before the step of transmitting the second message, the method 900 may further comprise: receiving, from the AC, a first message comprising the first parameter; and storing, in an AC profile for the AC, the first parameter at least based on the first message. In some embodiments, before the step of transmitting the second message, the method 900 may further comprise: transmitting, to a T-EES deployed in a second network node, a fourth message to query the second network node for one or more T-EASs for selection by the AC and/or the EEC, wherein the fourth message may comprise the first parameter, wherein the first parameter may be determined at least based on a stored AC profile for the AC. In some embodiments, before the step of transmitting the second message, the method 900 may further comprise: transmitting, to a T-EES deployed in a second network node, a fourth message to query the second network node for one or more T-EASs for selection by the AC and/or the EEC, wherein the fourth message may comprise a fourth parameter indicating whether an early T-EAS connection is needed by the AC or not, wherein the fourth parameter may be determined at least based on a stored AC profile for the AC. In some embodiments, before the step of transmitting the second message, the method 900 may further comprise: transmitting, to a T-EES deployed in a second network node, a fourth message to query the second network node for one or more T-EASs for selection by the AC and/or the EEC, wherein the fourth message may comprise a fifth parameter whether a T-EAS with CAS support is needed by the AC or not, wherein the fifth parameter may be determined at least based on a stored AC profile for the AC.

In some embodiments, the method 900 may further comprise: receiving, from the second network node, at least one T-EAS that supports the simultaneous EAS connectivity in ACR for the AC when the first parameter indicates that the simultaneous EAS connectivity in ACR is needed by the AC. In some embodiments, the at least one T-EAS may support the simultaneous EAS connectivity in ACR for the AC by also functioning as a CAS that has no restriction or less restriction in its service area than an EAS.

In some embodiments, the method 900 may further comprise: receiving, from the second network node, at least one T-EAS that supports and/or does not support the simultaneous EAS connectivity in ACR for the AC when the first parameter indicates that the simultaneous EAS connectivity in ACR is not needed by the AC. In some embodiments, the first message may be an AC registration request for registering the AC with the EEC, and/or the second message may be an ACR request for requesting an ACR from an S-EAS to a T-EAS for the AC, and the third message may be an ACR response, and/or the fourth message may be an EAS discovery request, and/or the first network node may be a network node where an S-EES is deployed.

Figure 10:
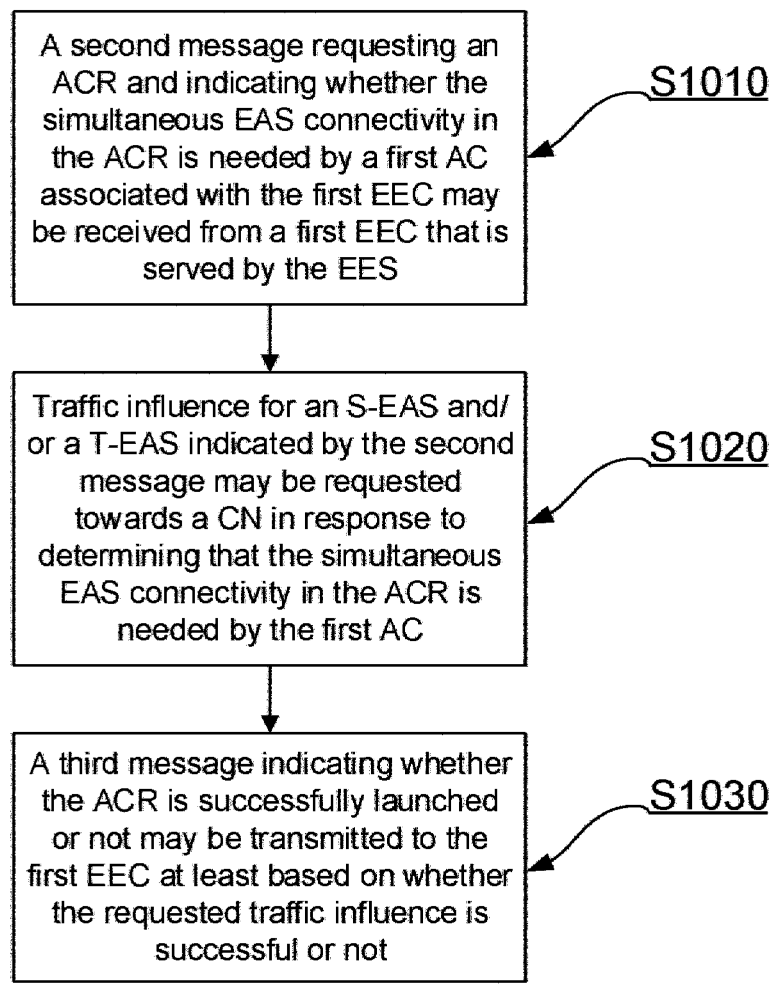
FIG. 10 is a flow chart illustrating an exemplary method by an EES deployed at a network node for supporting simultaneous EAS connectivity in ACR according to an embodiment of the present disclosure.

FIG. 10 is a flow chart of an exemplary method 1000 by an EES deployed at a network node for supporting simultaneous EAS connectivity in ACR according to an embodiment of the present disclosure. The method 1000 may be performed by an EES deployed at a network node (e.g., the EES 233 at a network node in the EDN 230). The method 1000 may comprise steps S1010, S1020, and S1030. However, the present disclosure is not limited thereto. In some other embodiments, the method 1000 may comprise more steps, less steps, different steps, or any combination thereof. Further the steps of the method 1000 may be performed in a different order than that described herein. Further, in some embodiments, a step in the method 1000 may be split into multiple sub-steps and performed by different entities, and/or multiple steps in the method 1000 may be combined into a single step.

The method 1000 may begin at step S1010 where a second message requesting an ACR and indicating whether the simultaneous EAS connectivity in the ACR is needed by a first AC associated with the first EEC may be received from a first EEC that is served by the EES.

At step S1020, traffic influence for an S-EAS and/or a T-EAS indicated by the second message may be requested towards a CN in response to determining that the simultaneous EAS connectivity in the ACR is needed by the first AC.

At step S1030, a third message indicating whether the ACR is successfully launched or not may be transmitted to the first EEC at least based on whether the requested traffic influence is successful or not.

In some embodiments, after the step of receiving the second message and before the step of requesting the traffic influence, the method 1000 may further comprise: performing an authorization check on the second message, wherein the step of transmitting the third message may comprise at least one of: transmitting, to the first EEC, the third message indicating whether the ACR is successfully launched or not at least based on a result of the authorization check and whether the requested traffic influence is successful or not. In some embodiments, the method 1000 may further comprise: receiving, from an EAS, a fifth message for indicating whether it can function as a CAS or not; and storing, in an EAS profile for the EAS, an indicator indicating whether the EAS can function as a CAS or not at least based on the fifth message.

In some embodiments, the method 1000 may further comprise: receiving, from a second EEC, a fourth message to query the network node for one or more T-EASs for selection by the second EEC and/or a second AC associated with the second EEC, wherein the fourth message may comprise a first parameter indicating whether the simultaneous EAS connectivity in ACR is needed by the second AC or not, wherein the second EEC may be the first EEC or the second EEC may not be the first EEC.

In some embodiments, the method 1000 may further comprise: receiving, from a second EEC, a fourth message to query the network node for one or more T-EASs for selection by the second EEC and/or a second AC associated with the second EEC, wherein the fourth message may comprise a fourth parameter indicating whether an early T-EAS connection is needed by the AC or not, wherein the second EEC may be the first EEC or the second EEC may not be the first EEC. In some embodiments, the method 1000 may further comprise: receiving, from a second EEC, a fourth message to query the network node for one or more T-EASs for selection by the second EEC and/or a second AC associated with the second EEC, wherein the fourth message may comprise a fifth parameter indicating whether a T-EAS with CAS support is needed by the AC or not, wherein the second EEC may be the first EEC or the second EEC may not be the first EEC.

In some embodiments, the method 1000 may further comprise: determining one or more T-EASs that can function as CASs at least based on their EAS profiles when the fourth message may comprise an indicator indicating that the simultaneous EAS connectivity in ACR is needed by the AC; and transmitting, to the second EEC, a message indicating the one or more T-EASs at least based on the determination. In some embodiments, the method 1000 may further comprise: determining one or more T-EASs that can and/or cannot function as CASs at least based on their EAS profiles when the fourth message may comprise an indicator indicating that the simultaneous EAS connectivity in ACR is not needed by the AC; and transmitting, to the second EEC, a message indicating the one or more T-EASs at least based on the determination. In some embodiments, the second message may be an ACR request for requesting an ACR from an S-EAS to a T-EAS for the AC, and the third message may be an ACR response, and/or the fourth message may be an EAS discovery request, and/or the fifth message may be an EAS registration request.

Figure 11:
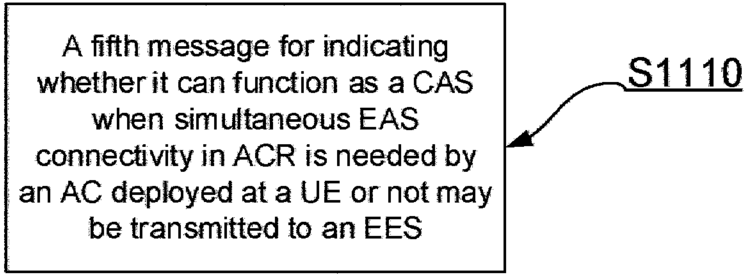
FIG. 11 is a flow chart illustrating an exemplary method by an EAS deployed at a network node for supporting simultaneous EAS connectivity in ACR according to an embodiment of the present disclosure.

FIG. 11 is a flow chart of an exemplary method 1100 by an EAS deployed at a network node for supporting simultaneous EAS connectivity in ACR according to an embodiment of the present disclosure. The method 1100 may be performed by an EAS deployed at a network node (e.g., the EAS 231 at a network node in the EDN 230). The method 1100 may comprise a step S1110. However, the present disclosure is not limited thereto. In some other embodiments, the method 1100 may comprise more steps, different steps, or any combination thereof. Further the steps of the method 1100 may be performed in a different order than that described herein. Further, in some embodiments, a step in the method 1100 may be split into multiple sub-steps and performed by different entities, and/or multiple steps in the method 1100 may be combined into a single step.

The method 1100 may begin at step S1110 where a fifth message for indicating whether it can function as a CAS when simultaneous EAS connectivity in ACR is needed by an AC deployed at a UE or not may be transmitted to an EES.

In some embodiments, the method 1100 may further comprise: serving the AC even when the UE is located outside of the service area of the EAS if the EAS can function as a CAS when the simultaneous EAS connectivity in ACR is needed by the AC. In some embodiments, the fifth message may be an EAS registration request.

Figure 12:
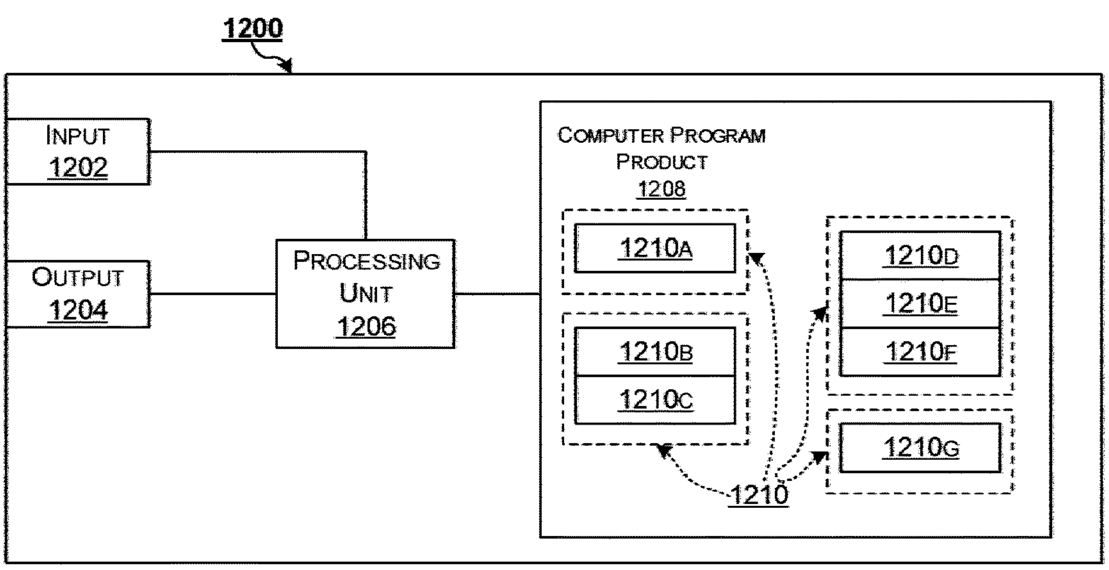
FIG. 12 schematically shows an embodiment of an arrangement which may be used in a UE and/or a network node according to an embodiment of the present disclosure.

FIG. 12 schematically shows an embodiment of an arrangement which may be used in a UE (e.g., AC/EEC) or a network node (e.g., EAS/EES) according to an embodiment of the present disclosure. Comprised in the arrangement 1200 are a processing unit 1206, e.g., with a Digital Signal Processor (DSP) or a Central Processing Unit (CPU). The processing unit 1206 may be a single unit or a plurality of units to perform different actions of procedures described herein. The arrangement 1200 may also comprise an input unit 1202 for receiving signals from other entities, and an output unit 1204 for providing signal(s) to other entities. The input unit 1202 and the output unit 1204 may be arranged as an integrated entity or as separate entities.

Furthermore, the arrangement 1200 may comprise at least one computer program product 1208 in the form of a non-volatile or volatile memory, e.g., an Electrically Erasable Programmable Read-Only Memory (EEPROM), a flash memory and/or a hard drive. The computer program product 1208 comprises a computer program 1210, which comprises code/computer readable instructions, which when executed by the processing unit 1206 in the arrangement 1200 causes the arrangement 1200 and/or the UE and/or the network node in which it is comprised to perform the actions, e.g., of the procedure described earlier in conjunction with FIG. 3 through FIG. 11 or any other variant.

The computer program 1210 may be configured as a computer program code structured in a computer program module 1210A. Hence, in an exemplifying embodiment when the arrangement 1200 is used in a UE, the code in the computer program of the arrangement 1200 includes: a module 1210A configured to communicate with a T-EAS via a first connection established between the AC and the T-EAS before a second connection between the AC and a S-EAS is released, to trigger an ACT procedure between the T-EAS and the S-EAS. In some embodiments, the UE comprise one or more modules configured to perform the method of any of the first aspect.

Additionally or alternatively, the computer program 1210 may be configured as a computer program code structured in computer program modules 1210B and 1210C. Hence, in an exemplifying embodiment when the arrangement 1200 is used in a UE, the code in the computer program of the arrangement 1200 includes: a module 1210B configured to transmit, to a first network node, a second message requesting an ACR, wherein the second message comprises a first parameter indicating whether the simultaneous EAS connectivity in the ACR is needed by an AC associated with the EEC or not; and a module 1210C configured to receive, from the first network node, a third message comprising a third parameter indicating whether the ACR is successfully launched or not.

Additionally or alternatively, the computer program 1210 may be configured as a computer program code structured in computer program modules 1210D, 1210E, and 1210F. Hence, in an exemplifying embodiment when the arrangement 1200 is used in a network node, the code in the computer program of the arrangement 1200 includes: a module 1210D configured to receive, from a first EEC that is served by the EES, a second message requesting an ACR and indicating whether the simultaneous EAS connectivity in the ACR is needed by a first AC associated with the first EEC; a module 1210E configured to request, towards a CN, traffic influence for an S-EAS and/or a T-EAS indicated by the second message in response to determining that the simultaneous EAS connectivity in the ACR is needed by the first AC; and a module 1210F configured to transmit, to the first EEC, a third message indicating whether the ACR is successfully launched or not at least based on whether the requested traffic influence is successful or not.

Additionally or alternatively, the computer program 1210 may be configured as a computer program code structured in a computer program module 1210G. Hence, in an exemplifying embodiment when the arrangement 1200 is used in a network node, the code in the computer program of the arrangement 1200 includes: a module 1210G configured to transmit, to an EES, a fifth message for indicating whether it can function as a CAS when simultaneous EAS connectivity in ACR is needed by an AC deployed at a UE or not The computer program modules could essentially perform the actions of the flow illustrated in FIG. 3 through FIG. 11, to emulate the UE and/or the network node. In other words, when the different computer program modules are executed in the processing unit 1206, they may correspond to different modules in the first network node and/or the second network node.

Although the code means in the embodiments disclosed above in conjunction with FIG. 12 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE and/or network node.

Figure 13:
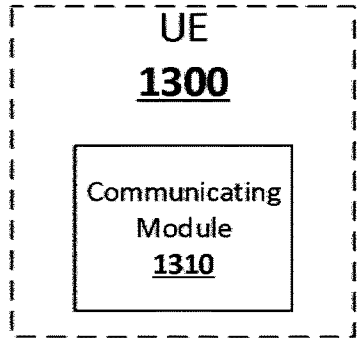
FIG. 13 is a block diagram of an exemplary UE according to an embodiment of the present disclosure.

Correspondingly to the method 800 as described above, an exemplary UE is provided. FIG. 13 is a block diagram of a UE 1300 according to an embodiment of the present disclosure. The UE 1300 may be, e.g., the UE 200 in some embodiments.

The UE 1300 may be configured to perform the method 800 as described above in connection with FIG. 8. As shown in FIG. 13, the UE 1300 may comprise a communicating module 1310 configured to communicate with a T-EAS via a first connection established between the AC and the T-EAS before a second connection between the AC and a S-EAS is released, to trigger an ACT procedure between the T-EAS and the S-EAS.

The above module 1310 may be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 8. Further, the UE 1300 may comprise one or more further modules, each of which may perform any of the steps of the method 800 described with reference to FIG. 8.

Figure 14:
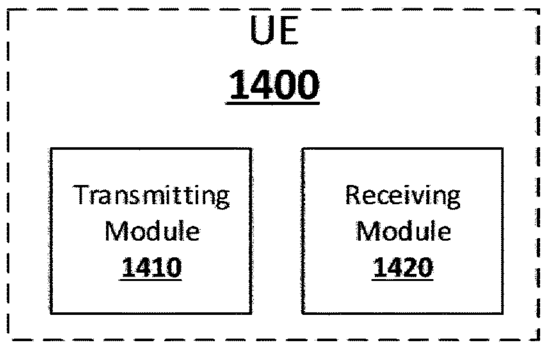
FIG. 14 is a block diagram of another exemplary UE according to another embodiment of the present disclosure.

Correspondingly to the method 900 as described above, an exemplary UE is provided. FIG. 14 is a block diagram of a UE 1400 according to an embodiment of the present disclosure. The UE 1400 may be, e.g., the UE 200 in some embodiments.

The UE 1400 may be configured to perform the method 900 as described above in connection with FIG. 9. As shown in FIG. 14, the UE 1400 may comprise a transmitting module 1410 configured to transmit, to a first network node, a second message requesting an ACR, wherein the second message comprises a first parameter indicating whether the simultaneous EAS connectivity in the ACR is needed by an AC associated with the EEC or not; and a receiving module 1420 configured to receive, from the first network node, a third message comprising a third parameter indicating whether the ACR is successfully launched or not.

The above modules 1410 and 1420 may be implemented as a pure hardware solution or as a combination of software and hardware, e.g., by one or more of: a processor or a micro-processor and adequate software and memory for storing of the software, a PLD or other electronic component(s) or processing circuitry configured to perform the actions described above, and illustrated, e.g., in FIG. 9. Further, the UE 1400 may comprise one or more further modules, each of which may perform any of the steps of the method 900 described with reference to FIG. 9.

Figure 15:
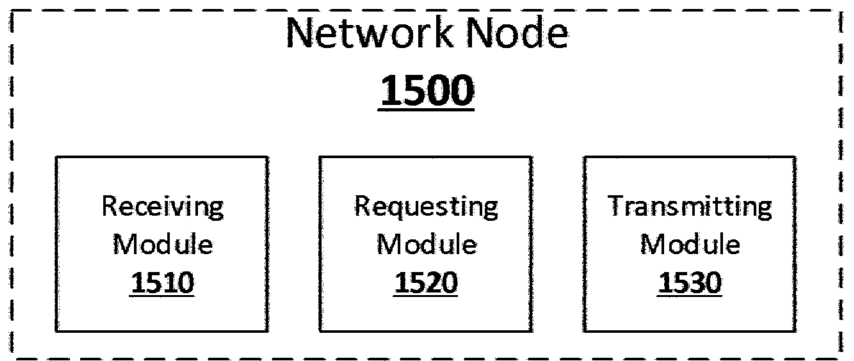
FIG. 15 is a block diagram of an exemplary network node according to an embodiment of the present disclosure.

Correspondingly to the method 1000 as described above, an exemplary network node is provided. FIG. 15 is a block diagram of a network node 1500 according to an embodiment of the present disclosure. The network node 1500 may be, e.g., a network node where the EES 233 is deployed in some embodiments.

The network node 1500 may be configured to perform the method 1000 as described above in connection with FIG. 10. As shown in FIG. 15, the network node 1500 may comprise a receiving module 1510 configured to receive, from a first EEC that is served by the EES, a second message requesting an ACR and indicating whether the simultaneous EAS connectivity in the ACR is needed by a first AC associated with the first EEC; a requesting module 1520 configured to request, towards a CN, traffic influence for an S-EAS and/or a T-EAS indicated by the second message in response to determining that the simultaneous EAS connectivity in the ACR is needed by the first AC; and a transmitting module 1530 configured to transmit, to the first EEC, a third message indicating whether the ACR is successfully launched or not at least based on whether the requested traffic influence is successful or not.

The above modules 1510, 1520, and 1530 may be implemented as a pure hardware solution or as a combination of software and hardware, e.g., by one or more of: a processor or a micro-processor and adequate software and memory for storing of the software, a PLD or other electronic component (s) or processing circuitry configured to perform the actions described above, and illustrated, e.g., in FIG. 10. Further, the network node 1500 may comprise one or more further modules, each of which may perform any of the steps of the method 1000 described with reference to FIG. 10.

Figure 16:
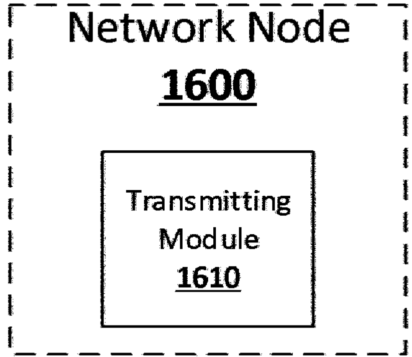
FIG. 16 is a block diagram of another exemplary network node according to another embodiment of the present disclosure.

Correspondingly to the method 1100 as described above, an exemplary network node is provided. FIG. 16 is a block diagram of a network node 1600 according to an embodiment of the present disclosure. The network node 1600 may be, e.g., a network node where the EAS 231 is deployed in some embodiments.

The network node 1600 may be configured to perform the method 1100 as described above in connection with FIG. 11. As shown in FIG. 16, the network node 1600 may comprise a transmitting module 1610 configured to transmit, to an EES, a fifth message for indicating whether it can function as a CAS when simultaneous EAS connectivity in ACR is needed by an AC deployed at a UE or not.

The above module 1610 may be implemented as a pure hardware solution or as a combination of software and hardware, e.g., by one or more of: a processor or a micro-processor and adequate software and memory for storing of the software, a PLD or other electronic component(s) or processing circuitry configured to perform the actions described above, and illustrated, e.g., in FIG. 11. Further, the network node 1600 may comprise one or more further modules, each of which may perform any of the steps of the method 1100 described with reference to FIG. 11.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

| Abbreviation | Explanation |
|---|---|
| AC | Application Client |
| ACR | Application Context Relocation |
| ACT | Application Context Transfer |
| CAS | Central Application Server |
| CN | Core Network |
| EAS | Edge Application Server |
| ECS | Edge Configuration Server |
| EDN | Edge Data Network |
| EEC | Edge Enabler Client |
| EES | Edge Enabler Server |
| S-EAS | Source EAS or Serving EAS |
| T-EAS | Target EAS |
| S-EES | Source EES or Serving EES |
| T-EES | Target EES |

What is claimed is:

1. A method by an Application Client (AC) deployed at a User Equipment (UE) for supporting simultaneous Edge Application Server (EAS) connectivity in Application Context Relocation (ACR), the method comprising:

transmitting, to an Edge Enabler Client (EEC) associated with the AC, a first message comprising a first parameter indicating whether the simultaneous EAS connectivity in the ACR is needed by the AC or not; and communicating with a target EAS (T-EAS) via a first connection established between the AC and the T-EAS before a second connection between the AC and a source EAS (S-EAS) is released, to trigger an Application Context Transfer (ACT) procedure between the T-EAS and the S-EAS.

2. The method of claim 1, wherein application traffic from the AC is received by at least one of the S-EAS and the T-EAS during the ACT procedure; and/or wherein application traffic to the AC is transmitted by at least one of the S-EAS and the T-EAS during the ACT procedure.

3. The method of claim 1, wherein at least one of the following is true:

the application traffic from the AC is received by the T-EAS when the UE is located outside of the service area of the T-EAS;

the application traffic to the AC is transmitted by the T-EAS when the UE is located outside of the service area of the T-EAS;

the application traffic from the AC is received by the S-EAS when the UE is located outside of the service area of the S-EAS; and the application traffic to the AC is transmitted by the S-EAS when the UE is located outside of the service area of the S-EAS.

4. The method of claim 1, wherein the first message further comprises a second parameter indicating inactive time guidance for keeping connectivity towards the S-EAS when the first parameter indicates that the simultaneous EAS connectivity in the ACR is needed by the AC.

5. The method of claim 1, wherein before the step of communicating with the T-EAS, the method further comprises:

triggering the EEC to transmit, to an Edge Enabler Server (EES) deployed in a first network node, a second message requesting an ACR, wherein the second message comprises the first parameter and/or a second parameter.

6. The method of claim 1, wherein the first message is an AC registration request for registering the AC with the EEC, and/or wherein a second message is an ACR request for requesting an ACR from the S-EAS to the T-EAS for the AC.

7. A method by an Edge Enabler Client (EEC) deployed at a user equipment (UE) for supporting simultaneous Edge Application Server (EAS) connectivity in Application Context Relocation (ACR), the method comprising:

transmitting, to a first network node, a second message requesting the ACR, wherein the second message comprises a first parameter indicating whether the simultaneous EAS connectivity in the ACR is needed by an Application Client (AC) associated with the EEC or not; and receiving, from the first network node, a third message comprising a third parameter indicating whether the ACR is successfully launched or not.

8. The method of claim 7, wherein before the step of transmitting the second message, the method further comprises:

receiving, from the AC, a first message comprising the first parameter; and storing, in an AC profile for the AC, the first parameter at least based on the first message.

9. The method of claim 7, wherein before the step of transmitting the second message, the method further comprises:

transmitting, to a target EES (T-EES) deployed in a second network node, a fourth message to query the second network node for one or more target EASs (T-EASs) for selection by the AC and/or the EEC, wherein the fourth message comprises the first parameter, wherein the first parameter is determined at least based on a stored AC profile for the AC.

10. The method of claim 9, further comprising:

receiving, from the second network node, the one or more T-EASs that support the simultaneous EAS connectivity in the ACR for the AC when the first parameter indicates that the simultaneous EAS connectivity in the ACR is needed by the AC.

11. The method of claim 10, wherein the one or more T-EASs support the simultaneous EAS connectivity in the ACR for the AC by also functioning as a CAS that has no restriction or less restriction in its service area than an EAS.

12. The method of claim 7, wherein before the step of transmitting the second message, the method further comprises:

transmitting, to a T-EES deployed in a second network node, a fourth message to query the second network node for one or more T-EASs for selection by the AC and/or the EEC, wherein the fourth message comprises a fourth parameter indicating whether an early T-EAS connection is needed by the AC or not, wherein the fourth parameter is determined at least based on a stored AC profile for the AC.

13. The method of claim 7, wherein before the step of transmitting the second message, the method further comprises:

transmitting, to a T-EES deployed in a second network node, a fourth message to query the second network node for one or more T-EASs for selection by the AC and/or the EEC, wherein the fourth message comprises a fifth parameter indicating whether a T-EAS with Central Application Server (CAS) support is needed by the AC or not, wherein the fifth parameter is determined at least based on a stored AC profile for the AC.

14. A user equipment (UE), comprising:

a processor;

a memory storing instructions which, when executed by the processor, cause the processor to perform operations comprising:

transmit, to a first network node, a second message requesting an Application Context Relocation (ACR), wherein the second message comprises a first parameter indicating whether simultaneous Edge Application Server (EAS) connectivity in the ACR is needed by an Application Client (AC) associated with an Edge Enabler Client (EEC) or not; and receive, from the first network node, a third message comprising a third parameter indicating whether the ACR is successfully launched or not.

15. The UE of claim 14, wherein before the operation of transmit the second message, the operations further comprise:

receive, from the AC, a first message comprising the first parameter; and store, in an AC profile for the AC, the first parameter at least based on the first message.

16. The UE of claim 14, wherein before the operation of transmit the second message, the operations further comprise:

transmit, to a target Edge Enabler Server (T-EES) deployed in a second network node, a fourth message to query the second network node for one or more target Edge Application Servers (T-EASs) for selection by the AC and/or the EEC, wherein the fourth message comprises the first parameter, wherein the first parameter is determined at least based on a stored AC profile for the AC.

17. The UE of claim 16, the operations further comprising:

receive, from the second network node, the one or more T-EASs that support the simultaneous EAS connectivity in the ACR for the AC when the first parameter indicates that the simultaneous EAS connectivity in the ACR is needed by the AC.

18. The UE of claim 17, wherein the one or more T-EASs support the simultaneous EAS connectivity in the ACR for the AC by also functioning as a CAS that has no restriction or less restriction in its service area than an EAS.

19. The UE of claim 14, wherein before the operation of transmit the second message, the operations further comprise:

transmit, to a T-EES deployed in a second network node, a fourth message to query the second network node for one or more T-EASs for selection by the AC and/or the EEC, wherein the fourth message comprises a fourth parameter indicating whether an early T-EAS connection is needed by the AC or not, wherein the fourth parameter is determined at least based on a stored AC profile for the AC.

20. The UE of claim 14, wherein before the operation of transmit the second message, the operations further comprise:

transmit, to a T-EES deployed in a second network node, a fourth message to query the second network node for one or more T-EASs for selection by the AC and/or the EEC, wherein the fourth message comprises a fifth parameter indicating whether a T-EAS with Central Application Server (CAS) support is needed by the AC or not, wherein the fifth parameter is determined at least based on a stored AC profile for the AC.

* * * * *